United States Patent
Couture et al.

(10) Patent No.: US 12,397,865 B2
(45) Date of Patent: Aug. 26, 2025

(54) TRACK ASSEMBLY FOR A VEHICLE

(71) Applicants: BOMBARDIER RECREATIONAL PRODUCTS INC., Valcourt (CA); SOUCY INTERNATIONAL INC., Drummondville (CA)

(72) Inventors: Raphael Couture, Sherbrooke (CA); Yan Roger, Drummondville (CA); Stephane Pelletier, Drummondville (CA); Patrick L'Herault, St-Majorique de Grantham (CA); Jeremie Aubin-Marchand, St-Hugues (CA); Charles Roy, Orford (CA)

(73) Assignees: BOMBARDIER RECREATIONAL PRODUCTS INC., Valcourt (CA); SOUCY INTERNATIONAL INC., Drummondville (CA)

( * ) Notice: Subject to any disclaimer, the term of this patent is extended or adjusted under 35 U.S.C. 154(b) by 783 days.

(21) Appl. No.: 17/427,324

(22) PCT Filed: Jan. 31, 2020

(86) PCT No.: PCT/IB2020/050812
§ 371 (c)(1),
(2) Date: Jul. 30, 2021

(87) PCT Pub. No.: WO2020/157727
PCT Pub. Date: Aug. 6, 2020

(65) Prior Publication Data
US 2022/0135153 A1    May 5, 2022

Related U.S. Application Data

(60) Provisional application No. 62/799,240, filed on Jan. 31, 2019.

(51) Int. Cl.
*B62D 55/084*    (2006.01)
*B62D 55/10*    (2006.01)
(Continued)

(52) U.S. Cl.
CPC .......... *B62D 55/084* (2013.01); *B62D 55/15* (2013.01); *B62D 55/305* (2013.01); *B62D 55/32* (2013.01); *B62D 55/10* (2013.01); *B62D 55/125* (2013.01)

(58) Field of Classification Search
CPC .... B62D 55/065; B62D 55/084; B62D 55/10; B62D 55/125; B62D 55/14; B62D 55/15; B62D 55/30; B62D 55/305; B62D 55/32
(Continued)

(56) References Cited

U.S. PATENT DOCUMENTS 3,658,145 A    4/1972   Bergmann et al.
3,692,132 A    9/1972   Pollanen
(Continued)

FOREIGN PATENT DOCUMENTS

CN    104691637 B    1/2016
CN    105984521 A  * 10/2016    ............. B62D 55/30
(Continued)

OTHER PUBLICATIONS

English translation of CN104691637B retrieved from https://patents.google.com/patent/CN104691637B/en?bq=cn104691637B on Jul. 26, 2021.
(Continued)

*Primary Examiner* — S. Joseph Morano
*Assistant Examiner* — Eva L Comino
(74) *Attorney, Agent, or Firm* — BCF LLP

(57) ABSTRACT

A track assembly for a vehicle has a frame; a drive wheel rotatably mounted to the frame; an idler wheel mount pivotally connected to the frame, the idler wheel mount
(Continued)

being selectively pivotable between an operating position and a released position; a lock selectively locking the idler wheel mount in the operating position; an idler wheel rotationally connected to the idler wheel mount, the idler wheel being pivotable with the idler wheel mount; and an endless track driven by the drive wheel around the frame. In the operating position of the idler wheel mount, the idler wheel tensions the endless track. Pivoting the idler wheel mount from the operating position to the released position releases at least some tension from the endless track. A vehicle having the track assembly and a method for installing an endless track having derailed from other components of a track assembly are also disclosed.

20 Claims, 16 Drawing Sheets

(51) Int. Cl.
  *B62D 55/125* (2006.01)
  *B62D 55/15* (2006.01)
  *B62D 55/30* (2006.01)
  *B62D 55/32* (2006.01)
(58) Field of Classification Search
  USPC .......................................................... 305/155
  See application file for complete search history.

(56) References Cited

U.S. PATENT DOCUMENTS

| | | | |
|---|---|---|---|
| 3,830,323 A | 8/1974 | Voulevi | |
| 3,840,082 A * | 10/1974 | Olson | B62M 27/02 |
| | | | 180/9.5 |
| 4,093,033 A | 6/1978 | Rosch | |
| 4,987,965 A | 1/1991 | Bourret | |
| 5,316,381 A * | 5/1994 | Isaacson | B62D 55/305 |
| | | | 305/145 |
| 6,715,575 B2 | 4/2004 | Karpik | |
| 6,869,153 B2 * | 3/2005 | Wright | B62D 55/305 |
| | | | 305/165 |
| 6,962,222 B2 | 11/2005 | Kirihata | |
| 7,802,645 B2 * | 9/2010 | Mallette | B62M 27/02 |
| | | | 180/190 |
| 8,056,656 B2 | 11/2011 | Todd et al. | |
| 8,607,912 B2 * | 12/2013 | Mallette | B62M 27/02 |
| | | | 180/193 |
| 8,955,925 B2 * | 2/2015 | Bessette | B60G 3/20 |
| | | | 305/128 |
| 9,394,015 B2 * | 7/2016 | Cox | B62D 55/10 |
| 10,814,935 B2 | 10/2020 | Vaisanen et al. | |
| 2005/0029866 A1 * | 2/2005 | Tamaru | B62D 55/305 |
| | | | 305/125 |
| 2005/0252592 A1 | 11/2005 | Albright et al. | |
| 2007/0029117 A1 | 2/2007 | Goldenberg et al. | |
| 2009/0050390 A1 * | 2/2009 | Mallette | B62M 27/02 |
| | | | 180/193 |
| 2014/0175864 A1 | 6/2014 | Marchildon et al. | |
| 2015/0329154 A1 * | 11/2015 | Roy | B62D 55/10 |
| | | | 305/142 |
| 2015/0329155 A1 | 11/2015 | Marchildon et al. | |
| 2016/0121970 A1 * | 5/2016 | Labbe | B62M 27/02 |
| | | | 180/193 |
| 2016/0194038 A1 * | 7/2016 | Jean | B62D 55/244 |
| | | | 305/15 |
| 2016/0194040 A1 * | 7/2016 | Bair | B62D 55/32 |
| | | | 29/428 |
| 2018/0043947 A1 * | 2/2018 | Brazier | B62D 55/04 |
| 2018/0237083 A1 | 8/2018 | Marchildon et al. | |
| 2018/0273141 A1 | 9/2018 | Vaisanen et al. | |
| 2021/0253185 A1 * | 8/2021 | Sauvageau | B62D 55/116 |

FOREIGN PATENT DOCUMENTS

| | | | |
|---|---|---|---|
| RU | 69825 U1 | 1/2008 | |
| WO | 2014116227 A1 | 7/2014 | |
| WO | WO-2016161528 A1 * | 10/2016 | ............. B62D 55/12 |
| WO | 2017056057 A2 | 4/2017 | |

OTHER PUBLICATIONS

International Search Report of PCT/IB2020/050812; Lee Young; Jun. 23, 2020.
English translation of RU69825U1 retrieved from https://patents.google.com/patent/RU69825U1/en?oq=US10814935 on Jul. 26, 2021.

* cited by examiner

TRACK ASSEMBLY FOR A VEHICLE

CROSS-REFERENCE

The present application claims priority to U.S. Provisional Patent Application No. 62/799,240, filed Jan. 31, 2019, the entirety of which is incorporated herein by reference.

FIELD OF TECHNOLOGY

The present technology relates to track assemblies for vehicles.

BACKGROUND

Side-by-side off-road vehicles (SSVs), all-terrain vehicles (ATVs) and similar vehicles are used for utility and recreational purposes. Some of these vehicles are configured to be interchangeably equipped with ground-engaging wheels or track assemblies, such as to allow a user to equip the vehicle with either option in accordance with terrain conditions and/or desired handling performance Track assemblies are particularly useful for instance when travelling over deep snow as the increased contact area between the track assemblies' tracks and the ground allows for greater floatation.

A track assembly typically includes a frame, a drive wheel rotationally connected to the frame, one or more idler wheels rotationally connected to the frame, an endless track disposed around the frame, the drive wheel and the one or more idler wheels, and a track tensioner. The drive wheel is connected to a wheel hub of the vehicle so as to be driven by the vehicle's motor, and thereby drive the endless track.

The track tensioner is used, as the name suggests, to apply tension to the endless track in order to ensure efficient operation of the track assembly. If there is too much tension on the endless track, the drive wheel, idler wheels, and the shafts and bearings rotationally connecting them to the frame of the track assembly could wear faster. If there is not enough tension on the track, the chance of the endless track derailing from the track assembly during use increase.

Even when the proper amount of tension is applied to the endless track, it is possible that under some operating condition the endless drive track could derail from the track assembly. This could occur for example when the track assembly encounters a sudden deep depression in the ground or when a high side load is applied to the endless track. Such conditions combined with the continued rotation of the endless drive track can lead to the derailment of the endless track. When the endless track derails, the endless track becomes loose and the drive wheel is no longer capable of driving the endless track.

When derailment occurs, the track tensioner which previously assisted in keeping the track from derailing now acts against the user trying to put the endless track back on the track assembly. As such, in order to put the endless track back on, the user has to either force the track back on, which may not be possible, or has to adjust the track tensioner so as to put it in a position that would apply less tension on the endless track.

However, as these track assemblies are provided in off-road vehicles, derailment can occur in an area far from a service station. As such, if the user does not have the proper tools to adjust the track tensioner, putting the endless track back on the track assembly may not be possible. Even if the user has the tools required, the derailment may have occurred in terrain conditions that make the track tensioner difficult to access. Additionally, adjusting the track tensioner can be time consuming. Also, once the endless track has been put back on the track assembly, the track tensioner has to be adjusted again, this time to put traction back in the endless track in order to avoid another derailment, thus adding to the amount of time required for this operation.

There is therefore a need for a track assembly for a vehicle that facilitates the installation of the endless track back on the track assembly in the event of a derailment of the endless track.

SUMMARY

It is an object of the present technology to ameliorate at least some of the inconveniences present in the prior art.

According to one aspect of the present technology, there is provided a track assembly for a vehicle having a frame; a drive wheel rotatably mounted to the frame about a drive wheel axis; an idler wheel mount pivotally connected to the frame about an idler wheel mount axis, the idler wheel mount axis being vertically below and longitudinally spaced from the drive wheel axis, the idler wheel mount being selectively pivotable between an operating position and a released position about the idler wheel mount axis; and a lock selectively locking the idler wheel mount in the operating position; an idler wheel rotationally connected to the idler wheel mount about an idler wheel axis, the idler wheel being pivotable about the idler wheel mount axis with the idler wheel mount. In the operating position of the idler wheel mount, the idler wheel axis is at a first longitudinal distance and at a first vertical distance from the drive wheel axis. In the released position of the idler wheel mount, the idler wheel axis is at a second longitudinal distance and at a second vertical distance from the drive wheel axis. The first longitudinal distance is greater than the second longitudinal distance. The first vertical distance is greater than the second vertical distance. An endless track is driven by the drive wheel around the frame. In the operating position of the idler wheel mount, the idler wheel tensions the endless track. Pivoting the idler wheel mount from the operating position to the released position releases at least some tension from the endless track.

In some embodiments of the present technology, in the operating position of the idler wheel mount, the idler wheel axis is vertically higher than the idler wheel mount axis.

In some embodiments of the present technology, the lock includes a fastener. The fastener fastens the idler wheel mount to the frame for locking the idler wheel mount in the operating position.

In some embodiments of the present technology, a slide rail is connected to a lower end of the frame. The idler wheel mount is pivotally connected to the slide rail. The idler wheel mount axis extends through the slide rail. The fastener fastens the idler wheel mount to the slide rail for locking the idler wheel mount in the operating position.

In some embodiments of the present technology, a slide rail is connected to a lower end of the frame. The idler wheel mount is pivotally connected to the slide rail. The idler wheel mount axis extends through the slide rail. The lock locks the idler wheel mount to the slide rail for locking the idler wheel mount in the operating position.

In some embodiments of the present technology, the drive wheel is rotatably mounted to an upper end of the frame.

In some embodiments of the present technology, the drive wheel is a drive sprocket.

In some embodiments of the present technology, in the endless track defines a plurality of apertures for receiving teeth of drive sprocket.

In some embodiments of the present technology, an idler wheel position adjuster connects the idler wheel to the idler wheel mount. The idler wheel position adjuster selectively changes a position of the idler wheel on the idler wheel mount for adjusting an amount of tension applied by the idler wheel on the endless track when the idler wheel mount is in the operating position.

In some embodiment of the present technology, when the idler mount is in the operating position the idler wheel position adjuster is adapted for changing a position of the idler wheel between a first position and a second position. The first position of the idler wheel is a position of the idler wheel where the idler wheel is longitudinally furthest from the drive wheel axis. The second position of the idler wheel is a position of the idler wheel where the idler wheel is longitudinally closest to the drive wheel axis. More tension is released from the endless track by pivoting the idler wheel mount from the operating position to the released position than by moving the idler wheel from the second position to the first position while the idler wheel mount is in the operating position.

In some embodiments of the present technology, the idler wheel is a front idler wheel. The idler wheel axis is a front idler wheel axis. The front idler wheel axis is forward of the drive wheel axis. The idler wheel mount pivots upward and rearward from the operating position to the released position.

In some embodiments of the present technology, in the operating position of the idler wheel mount, the front idler wheel axis is forward of the idler wheel mount axis. In the released position of the idler wheel mount, the front idler wheel axis is rearward of the idler wheel mount axis.

In some embodiments of the present technology, a rear idler wheel is rotationally connected to the frame about a rear idler wheel axis. The rear idler wheel axis is rearward of the drive wheel axis.

In some embodiments of the present technology, the idler wheel is a rear idler wheel. The idler wheel axis is a rear idler wheel axis. The rear idler wheel axis is rearward of the drive wheel axis. The idler wheel mount pivots upward and forward from the operating position to the released position.

In some embodiments of the present technology, in the operating position of the idler wheel mount, the rear idler wheel axis is rearward of the idler wheel mount axis. In the released position of the idler wheel mount, the rear idler wheel axis is forward of the idler wheel mount axis.

In some embodiments of the present technology, a front idler wheel is rotationally connected to the frame about a front idler wheel axis. The front idler wheel axis is forward of the drive wheel axis.

In some embodiments of the present technology, a holder is provided on the idler wheel mount for holding a tool onto the idler wheel mount for applying a torque to the idler wheel mount to pivot the idler wheel mount between the operating and released positions.

In some embodiments of the present technology, the holder is a hole defined in the idler wheel mount.

In some embodiments of the present technology, the idler wheel is a first idler wheel, the idler wheel mount is a first idler wheel mount, and the idler wheel is a first idler wheel. The track assembly also has a second idler wheel mount pivotally connected to the frame about the idler wheel mount axis. The first and second idler wheel mount are selectively pivotable together between the operating position and the released position. A second idler wheel is rotationally connected to the second idler wheel mount about the idler wheel axis. The second idler wheel is pivotable about the idler wheel mount axis with the second idler wheel mount.

In some embodiments of the present technology, the lock is a first lock. The track assembly also has a second lock selectively locking the second idler wheel mount in the operating position.

In some embodiments of the present technology, a first slide rail is connected to a lower end of the frame, and a second slide rail is connected to the lower end of the frame. The first idler wheel mount is pivotally connected to the first slide rail, the second idler wheel mount is pivotally connected to the second slide rail, and the idler wheel mount axis extends through the first and second slide rails.

In some embodiments of the present technology, the idler wheel mount axis is disposed below a line passing through the drive wheel axis and the idler wheel axis.

In some embodiments of the present technology, in the operating position, a projection of the slide rail on a vertically and longitudinally extending plane overlaps a projection of the idler wheel on the plane.

In some embodiments of the present technology, the drive wheel is adapted for connection to a rotatable axle of a vehicle.

In some embodiments of the present technology, the drive wheel defines a plurality of apertures used for fastening the drive wheel to a wheel hub assembly driven by the rotatable axle of the vehicle.

According to another aspect of the present technology, there is provided a vehicle having a vehicle frame, a motor connected to the vehicle frame, an axle operatively connected to and driven by the motor, a suspension assembly operatively connecting the axle to the vehicle frame, and a track assembly according to one or more of the above embodiments. The drive wheel of the track assembly is connected to and driven by the axle.

According to another aspect of the present technology, there is provided a method for installing an endless track having derailed from other components of a track assembly provided on a vehicle. The track assembly has a frame, a drive wheel rotatably mounted to the frame, and the endless track adapted to be driven by the drive wheel around the frame. The method comprises: unlocking an idler wheel mount from the frame; once the idler wheel mount is unlocked, pivoting the idler wheel mount and an idler wheel rotationally connected to the idler wheel mount about an idler wheel mount axis from an operating position to a released position; once the idler wheel mount is in the released position, realigning the endless track with the other components of the track assembly; once the endless track is realigned, pivoting the idler wheel mount and the idler wheel about the idler wheel mount axis from the released position back to the operating position thereby tensioning the endless track; and once the idler wheel mount is back in the operating position, locking the idler wheel mount in the operating position to the frame.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in a normal driving position, with the vehicle steered straight-ahead.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
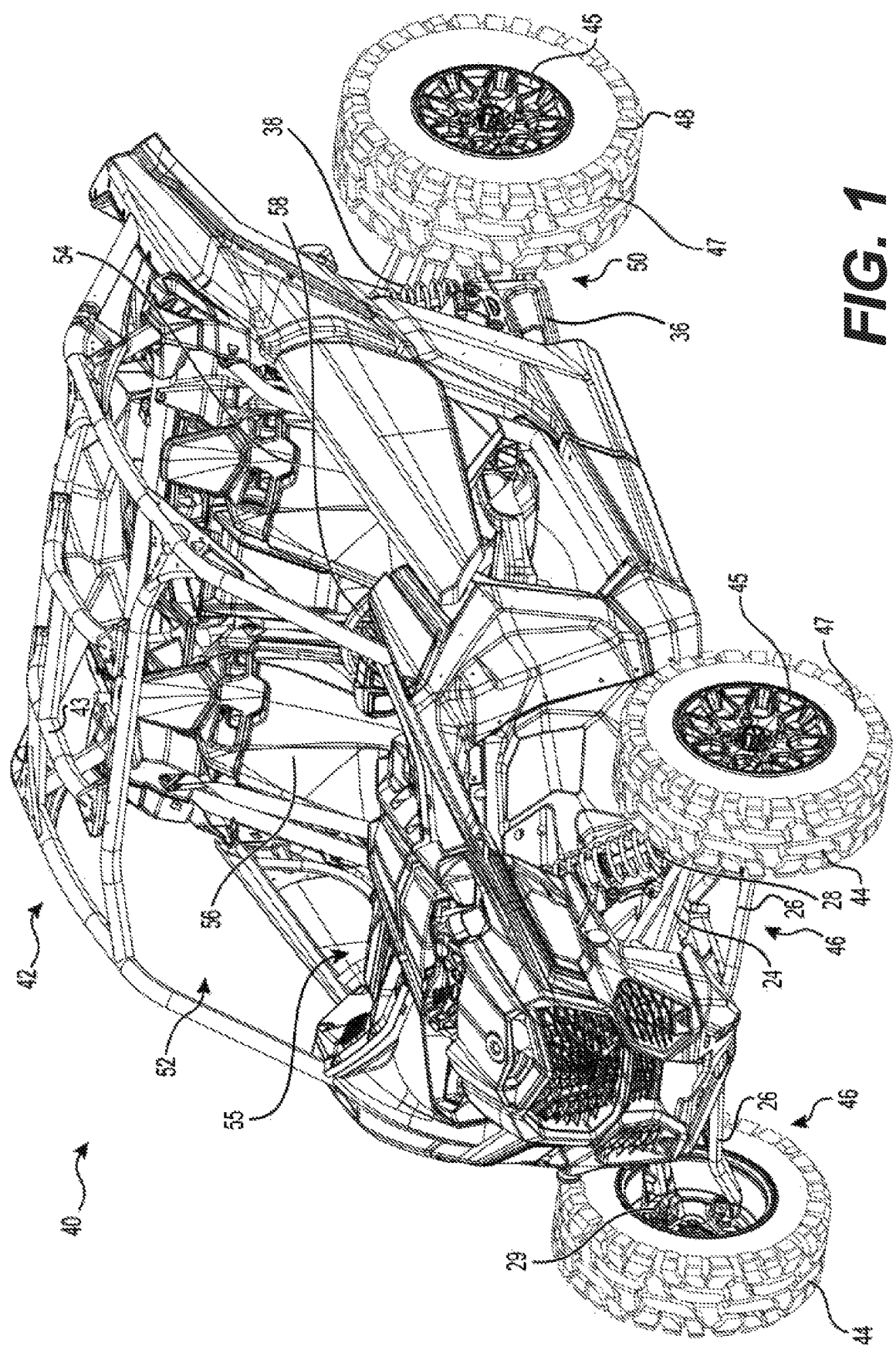
FIG. 1 is a perspective view taken from a front, right side of a side-by-side off-road vehicle having wheels.

The present technology will be described with respect to off-road vehicles having four ground-engaging members, two side-by-side seats and a steering wheel (i.e. a side-by-side vehicle (SSV)). However, it is contemplated that at least some aspects of the present technology may apply to other types of vehicles such as, but not limited to, off-road vehicles having a straddle seat and a handle bar (i.e. an all-terrain vehicle (ATV)), off-road vehicles having a single bucket-type seat, off-road vehicles with more than four ground-engaging members, as well as other vehicles that in which the ground-engaging members can be track assemblies.

The general features of an off-road vehicle 40, specifically a side-by-side vehicle (SSV) 40, will be described with respect to FIGS. 1 and 2. The vehicle 40 has a frame 42. The frame 42 defines a central cockpit area 52 inside which are disposed a driver seat 54 and a passenger seat 56. In the present implementation, the driver seat 54 is disposed on the left side of the vehicle 40 and the passenger seat 56 is disposed on the right side of the vehicle 40. However, it is contemplated that the driver seat 54 could be disposed on the right side of the vehicle 40 and that the passenger seat 56 could be disposed on the left side of the vehicle 40. It is also contemplated that the vehicle 40 could include a single seat for the driver, or a larger number of seats, or a bench accommodating the driver and at least one passenger. The vehicle 40 also includes a roll cage 43 connected to the frame 42 and extending at least partially over the seats 54, 56.

The vehicle 40 includes left and right front wheels 44 connected to the frame 42 by a pair of front suspension assemblies 46. Left and right rear wheels 48 are connected to the frame 42 by a pair of rear suspension assemblies 50. Each one of the front and rear wheels 44, 48 has a rim 45 and a tire 47. The rims 45 and tires 47 of the front wheels 44 may differ in size from the rims and tires of the rear wheels 48. As will be discussed in more detail below, the front and rear wheels 44, 48 can be removed, as shown in FIG. 2, and replaced with front and rear track assemblies 200, 100 respectively. Ground-engaging members of the type of front and rear track assemblies 200, 100 are sometimes referred to as track kits as they are often provided in kits sold separately from the vehicle that the user installs to replace the wheels. However, it is contemplated that the vehicle 40 could be provided with the track assemblies 200, 100 originally installed at the factory or the vehicle dealership and that these track assemblies 200, 100 may or may not be able to be replaced by the wheels 44, 48. It is also contemplated that the vehicle 40 could have the wheels 44 at the front thereof and the track assemblies 100 at the rear thereof. It is also contemplated that the vehicle 40 could have the track assemblies 100 at the rear thereof, and that the front thereof could be provided with another type of ground engaging members such as skis for example. The front and rear track assemblies 200, 100 will be described in more detail below.

The vehicle 40 includes a steering wheel 58 operatively connected to the front wheels 44 for controlling an angle of the front wheels 44. The driver operates the steering wheel 58 from the driver seat 54. The steering wheel 58 is disposed in front of the driver seat 54. The vehicle 40 also includes a dashboard 55 disposed forward of the seats 54, 56. A throttle operator in the form of a throttle pedal (not shown) is disposed over the floor of the cockpit area 52 below the steering wheel 58 and in front of the driver seat 54.

Figure 2:
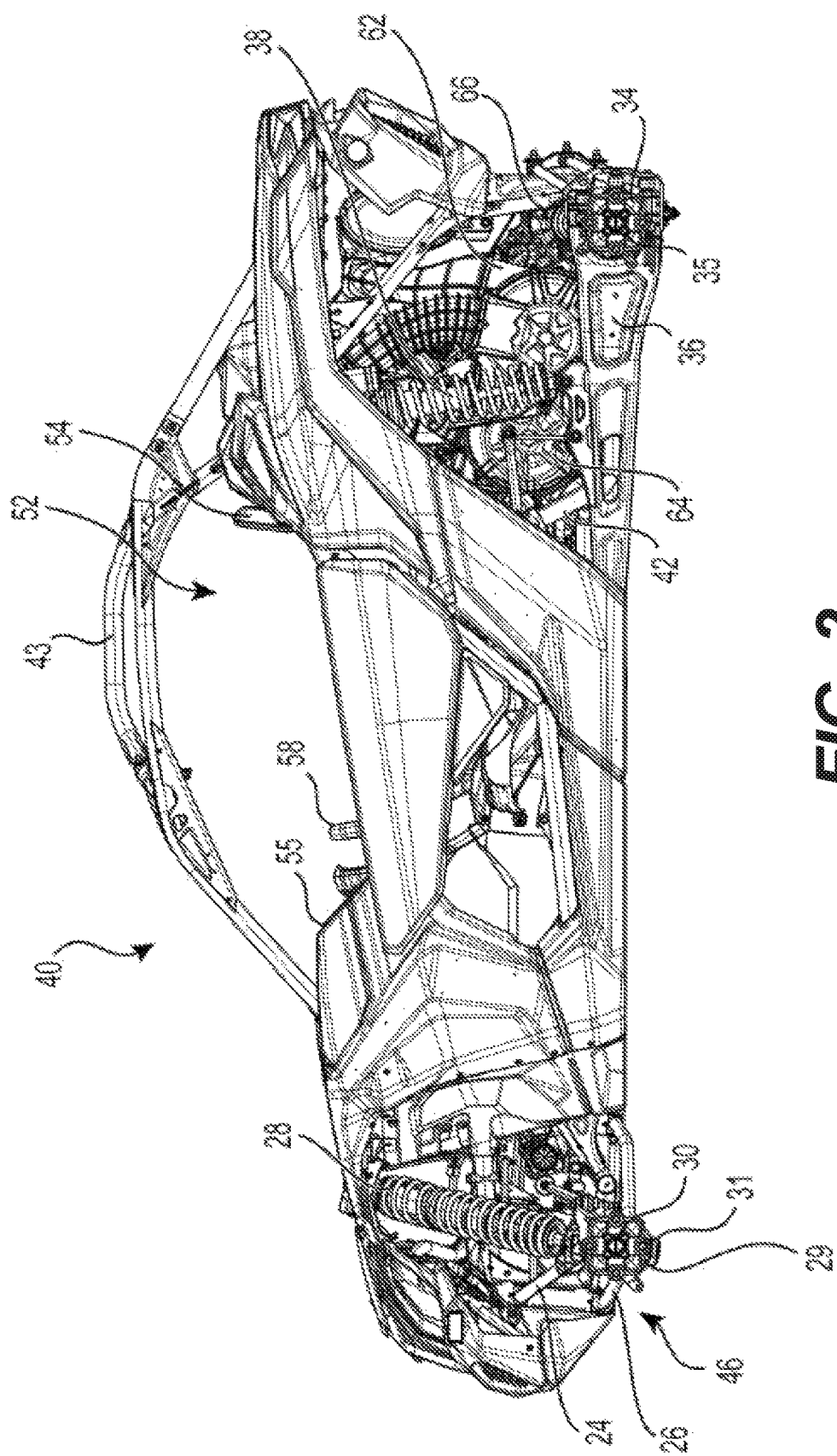
FIG. 2 is a left side elevation view of the vehicle of FIG. 1 with the wheels removed.

As can be seen in FIG. 2, a motor 62 is connected to the frame 42 in a rear portion of the vehicle 40. In the present embodiment, the motor 62 is an internal combustion engine but the present technology is not so limited. It is contemplated that the engine 62 could be replaced by a hybrid or electric motor in some implementations. The vehicle 40 includes an engine control module (ECM) for monitoring and controlling various operations of the engine 62.

As shown in FIG. 2, the motor 62 is connected to a transmission 64, specifically a continuously variable transmission (CVT) 64 disposed on a left side of the motor 62. The CVT 64 is operatively connected to a transaxle 66 to transmit torque from the motor 62 to the transaxle 66. The transaxle 66 is operatively connected to the front and rear wheels 44, 48 to propel the vehicle 40. The transaxle 66 drives a front differential (not shown) The motor 62 and the transmission 64 are supported by the frame 42. Variants of the vehicle 40 having other transmission types are contemplated.

The transaxle 66 transmits the torque applied thereon to drive the left and right rear wheels 48 via rear axles 35 connected to rear wheel hub assemblies 34. While the vehicle 40 is described with the rear wheels 48 driving the vehicle 40 when in 2×4 drive mode, it is contemplated that the front wheels 44 could be driven when the vehicle 40 is in 2×4 drive mode in some implementations. Specifically, the transaxle 66 includes left and right half-shafts and a differential connected therebetween for applying torque to the rear driven wheels 48. The differential is operatively connected between the transmission 64 and the left and right rear driven wheels 48. Furthermore, in a 4×4 drive mode, the front wheels 44 and the rear wheels 48 are driven. The front wheels 44 are driven via a front differential (not shown) operatively connected to the transaxle 66. The front differential transmits the torque applied thereon to drive the left and right front wheels 44 via front axles 31 connected to front wheel hub assemblies 30.

Figure 12:
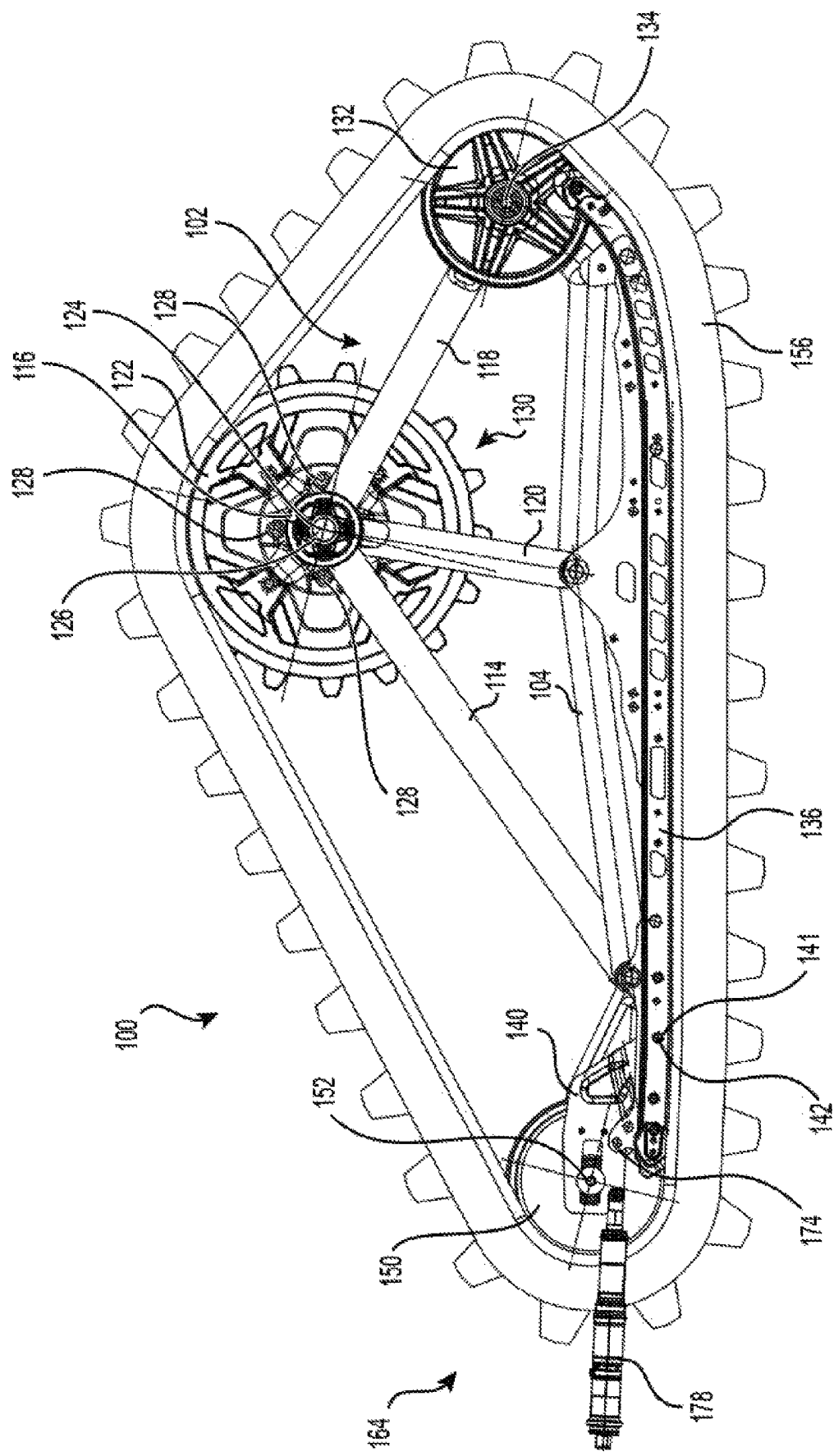
FIG. 12 is a right side elevation view of the track assembly of FIG. 4 with the fastener removed and illustrating the tool engaging a holder provided in the idler wheel mount for applying a torque to the idler wheel mount to pivot the idler wheel mount to the released position.

As shown in FIGS. 1, 2 and 12 each front suspension assembly 46 includes an upper A-arm 24, a lower A-arm 26, and a front shock absorber assembly 28. The upper and lower A-arms 24, 26 each have one end pivotably connected to the frame 42. A kingpin 29 (FIG. 2) is mounted to each opposed ends of the upper and lower A-arms 24, 26. The kingpins 29 rotationally support the front wheel hub assemblies 30. The front wheels 44 are connected to the front wheel hub assemblies 30.

Figure 3:
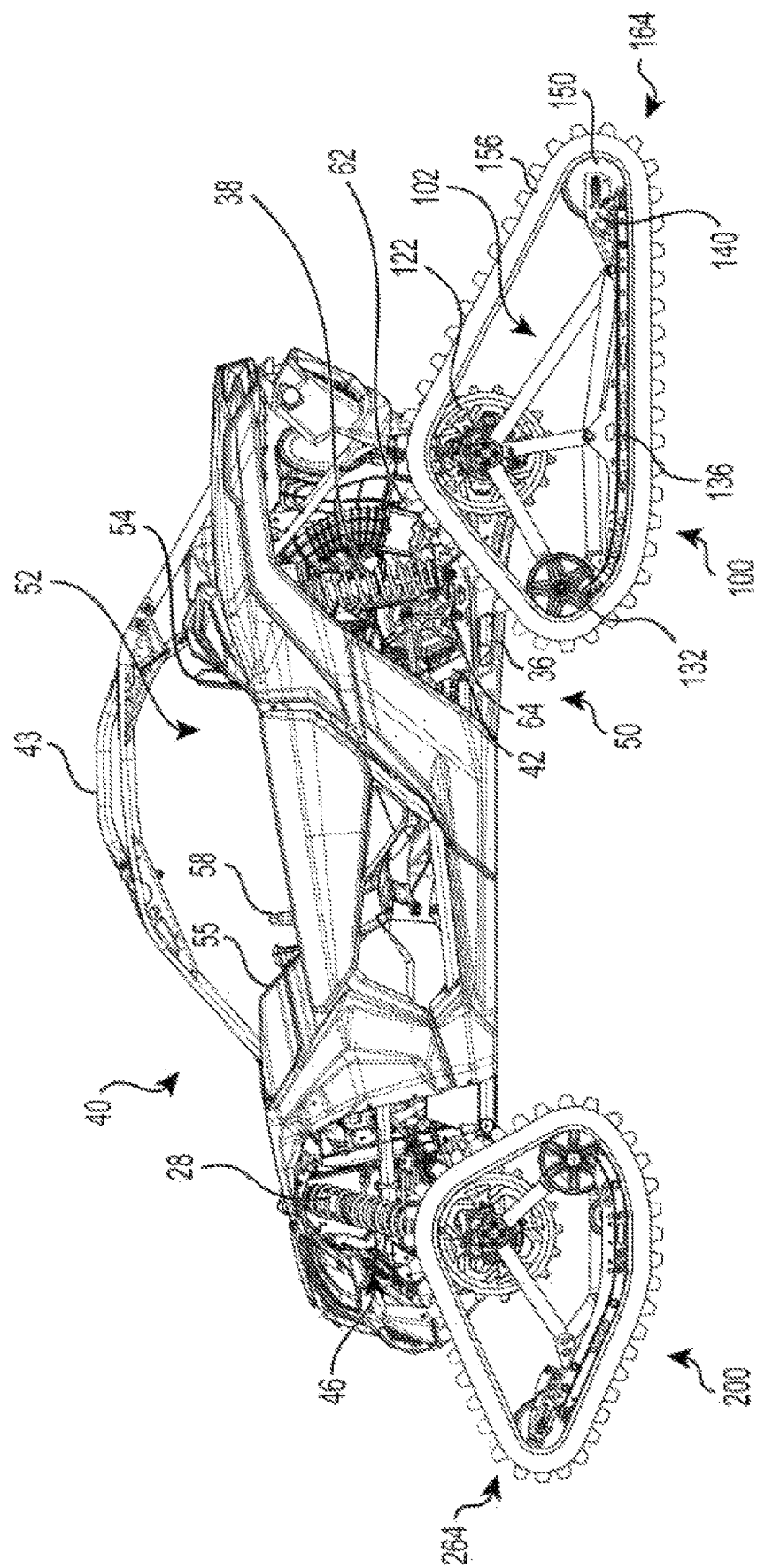
FIG. 3 is a left side elevation view of the vehicle of FIG. 1 with front and rear track assemblies provided instead of the wheels.

As shown in FIGS. 2 and 3, each rear suspension assembly 50 comprises a swing arm 36 and a rear shock absorber assembly 38. Each swing arm 36 has one end pivotably connected to the frame 42, about a pivot axis located in front of the rear wheels 48 and extending generally laterally within the frame 42, and an opposite end rotationally supporting the rear wheel hub assembly 34. The rear wheels 48 are connected to the rear wheel hub assemblies 34. The swing arms 36 are connected at mid-length to a torsion bar (not shown) by links.

Turning now to FIGS. 4 to 8, a rear, right track assembly 100 of the vehicle 40 of FIG. 3 will be described in more detail. A rear, left track assembly 100 of the vehicle 40 is a mirror image of the rear, right track assembly 100 and as such will not be described herein in detail.

Figure 7:
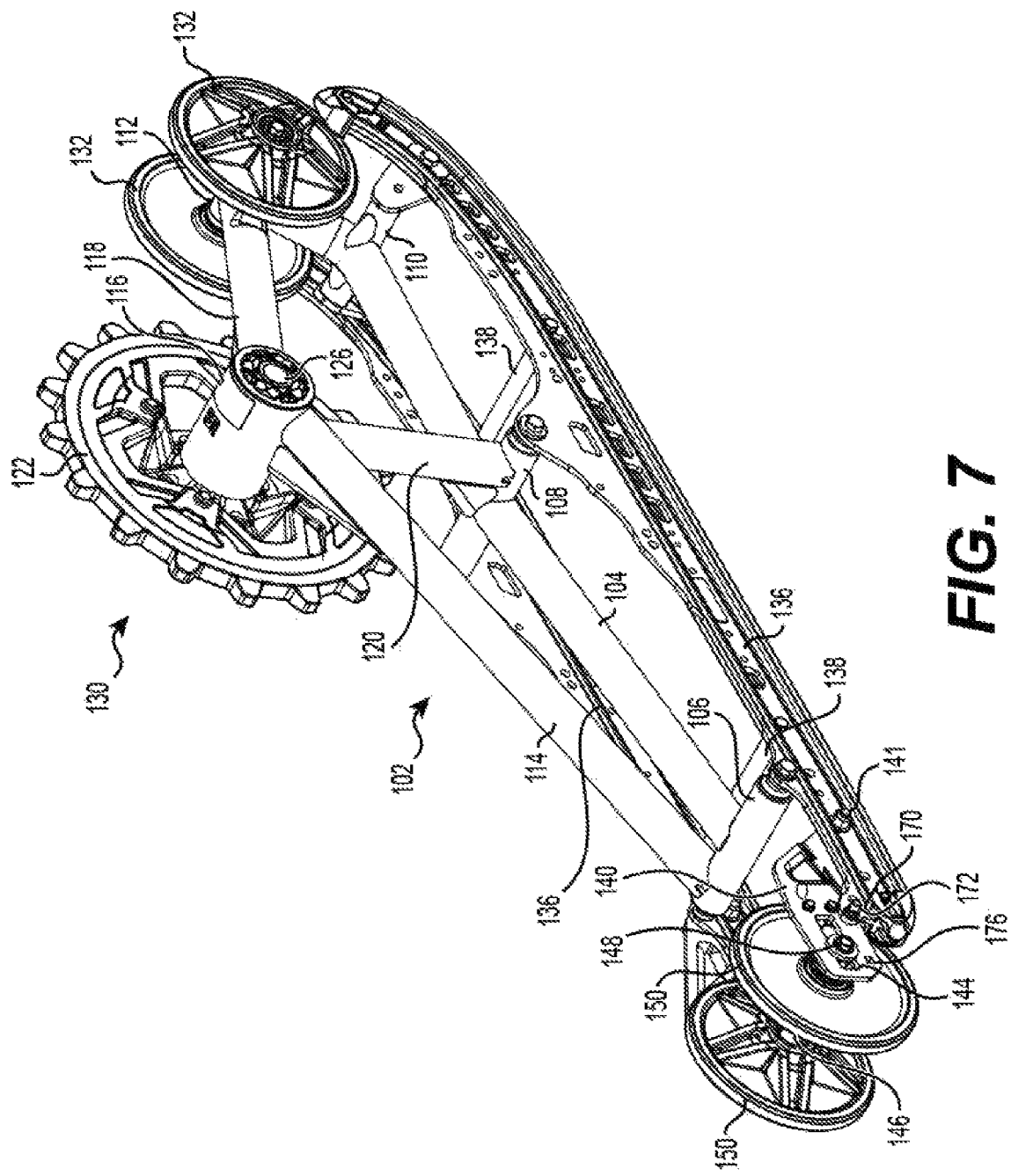
FIG. 7 is a perspective view, taken from a rear, right side of the track assembly of FIG. 4 with the idler wheel mounts in the operating position and the endless track removed.

The track assembly 100 has a frame 102. The frame 102 has a lower, longitudinally extending frame member 104. As best seen in FIG. 7, the frame member 104 is connected to a rear cross-member 106 at rear thereof, a central cross-member 108 near a center thereof, and a front cross-member 110 near a front thereof. The front end of the lower frame member 104 is connected to an axle holder 112. The frame 102 also includes a frame member 114 extending upward and forward from the rear cross-member 106 to an axle holder 116, a frame member 118 extending upward and rearward from the front cross-member 110 to the axle holder 116, and a frame member 120 extending upward and slightly forward from the central cross-member 108 to the axle holder 116.

Figure 4:
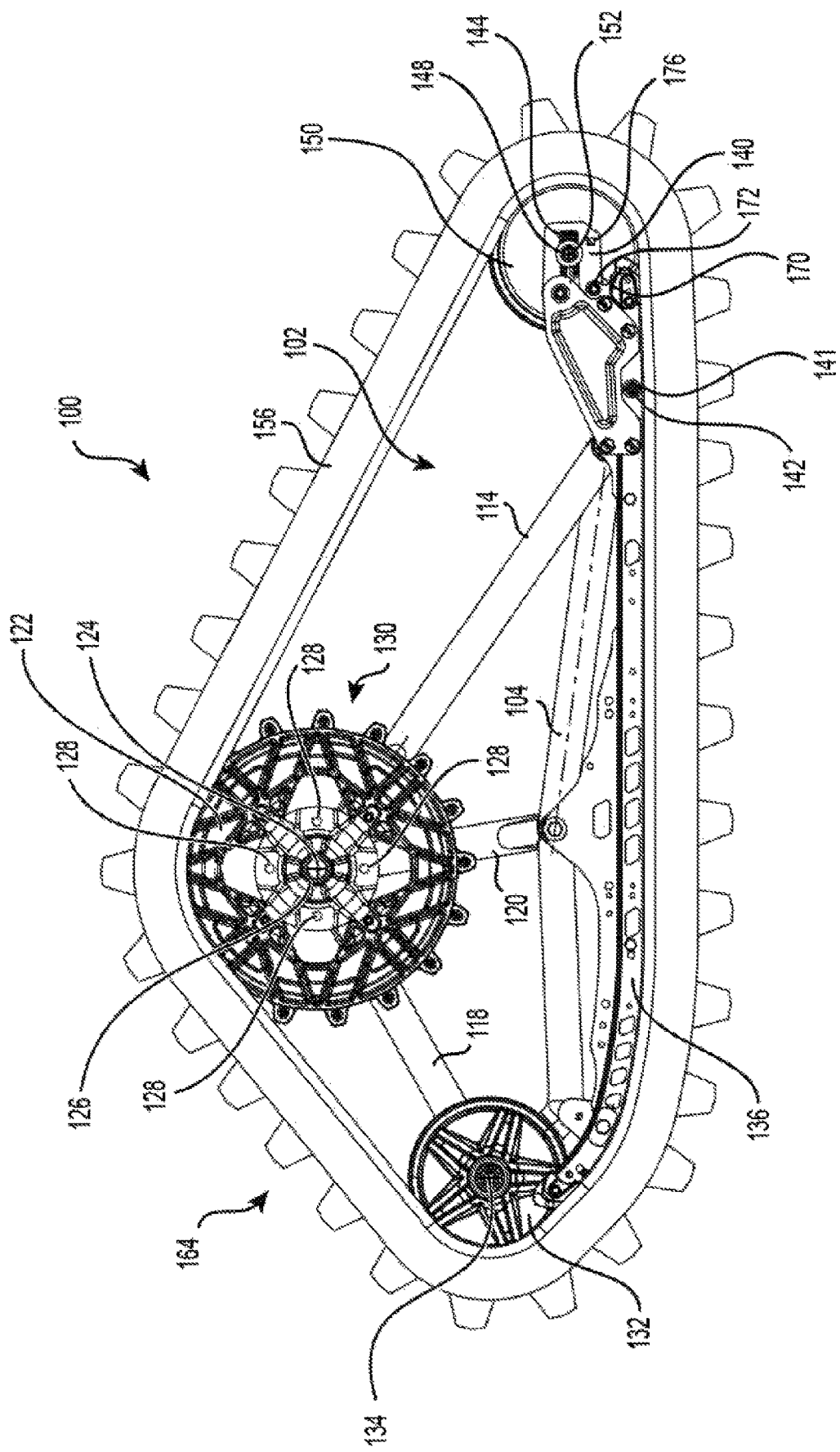
FIG. 4 is a left side elevation view of a rear, right track assembly of the vehicle of FIG. 3 with idler wheel mounts of the track assembly being in an operating position.

A drive wheel 122 is rotatably mounted to an upper end of the frame 102 about a drive wheel axis 124. More specifically, the drive wheel 122 is connected to an axle 126 that is supported by bearings (not shown) disposed inside the axle holder 116. The drive wheel 122 defines four apertures 128 (FIG. 4). The drive wheel 122 is disposed on the rear wheel hub assembly 34 such that studs extending from the rear wheel hub assembly 34 are received in the apertures 128. Nuts are then fastened onto the studs to fasten the drive wheel 122 to the rear wheel hub assembly 34 such that the drive wheel 122 can be driven. In the present implementation, the drive wheel 122 is a drive sprocket 122 having a plurality of radially projecting sprocket teeth 130. In an alternative embodiment, it is contemplated that in addition to or instead of the sprocket teeth 130, the drive sprocket 122 could have axially projecting teeth along a periphery thereof on one or both sides thereof.

Two front idler wheels 132 are rotationally connected to the axle holder 112 about a front idler wheel axis 134. The front idler wheels 132 are disposed on either side of the axle holder 112. As can be seen in FIG. 4, the front idler wheel axis 134 is forward and downward of the drive wheel axis 124.

Two slide rails 136 are connected to the lower end of the frame 102. As best seen in FIG. 7, the left slide rail 136 is connected to the left ends of the cross-members 106, 108, 110 and the right slide rail 136 is connected to the right ends of the cross-members 106, 108, 110. Two rods 138 are also connected between the two slide rails 136. The bottom of each slide rail 136 is flat at the rear and center and is upturned at the front.

Two idler wheel mounts 140 are pivotally connected to the rear portions of the slide rails 136 by fasteners 141. As such, the idler wheel mounts 140 are pivotally connected to the frame 102 via the slide rails 136. The idler wheel mounts 140 are selectively pivotable together about an idler wheel mount axis 142 between an operating position shown in FIGS. 4, 6, 7 and 9 and a released position shown in FIGS. 5, 8 and 10. The idler wheel mount axis 142 extends transversely through both slide rails 136 and is disposed vertically below and rearward of the drive wheel axis 124.

Figure 6:
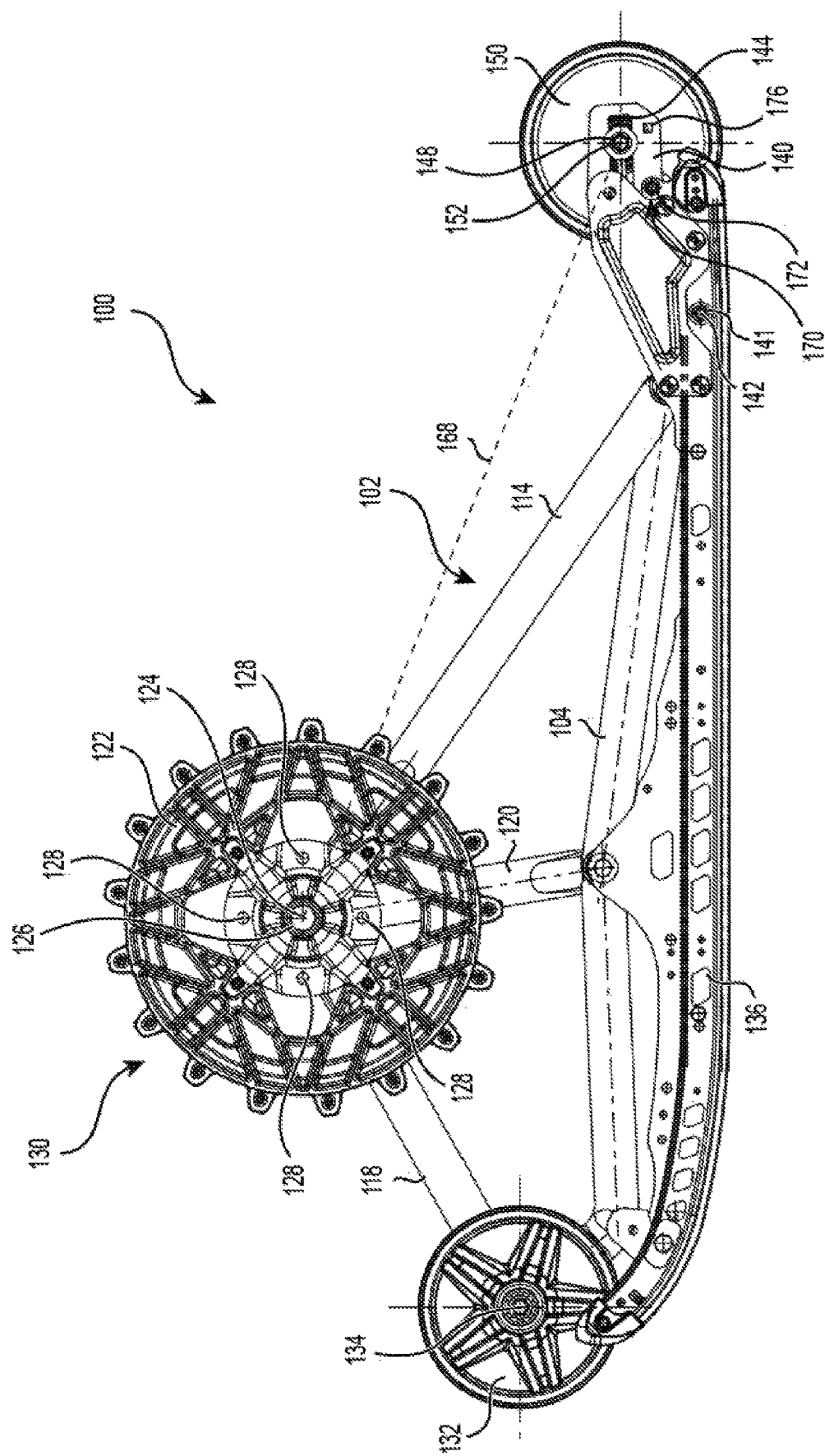
FIG. 6 is a left side elevation view of the track assembly of FIG. 4 with the idler wheel mounts in the operating position and the endless track removed.

Each idler wheel mount 140 defines a slot 144. An axle 146 is connected to and extends between the idler wheel mounts 140 via fasteners 148 inserted through the slots 144. A pair of rear idler wheels 150 is mounted to the axle 146 so as to be rotationally connected to the idler wheel mounts 140. The rear idler wheels 150 rotate about a rear idler wheel axis 152 defined by the axle 146. The rear idler wheels 150 and the axle 146 selectively pivot about the idler wheel mount axis 142 together with the idler wheel mounts 140. As can be seen in FIG. 6, when the idler wheel mounts 140 are in the operating position, a projection of the slide rails 136 onto a vertically and longitudinally extending plane (i.e. the plane corresponding to the drawing page for FIG. 6) overlap a projection of the rear idler wheels 150 on this plane. Two idler wheel position adjusters 154 (FIG. 9) are connected between the idler wheel mounts 140 and the axle 146. The idler wheel position adjusters 154 selectively adjust a position of the axle 146, and therefore the rear idler wheels 150, on the idler wheel mounts 140. In the present embodiments, the idler wheel position adjusters 154 include fasteners that when turned move the axle 146 forward or rearward by making the fasteners 148 translate in the slots 144.

It is contemplated that additional idler wheels could be connected to the slide rails 136 and/or the lower portion of the frame 102 at positions longitudinally between the front and rear idler wheels 132, 150. It is also contemplated that the idler wheel mounts 140 could be pivotally connected directly to the frame 102 instead of the slide rails 136. In an embodiment where the idler wheel mounts 140 are pivotally connected directly to the frame 102, it is contemplated that the slide rails 136 could be omitted and that additional idler wheels could be connected to the lower portion of the frame 102 at positions longitudinally between the front and rear idler wheels 132, 150.

The idler wheel mounts 140 and the rear idler wheels 150 will be described in more detail further below.

The rear track assembly 100 also has an endless track 156. The endless track 156 is disposed around the frame 102, the drive wheel 122, the idler wheels 132, 150, and the slide rails 136. More specifically, the drive wheel 122 and the idler wheels 132, 150 abut an inner surface of the endless track 156 and roll along the inner surface of the endless track 156 when in operation. The slide rails 136 also abut the inner surface of the endless track 156 which slides relative to the endless track 156 when in operation. In order to keep the endless track 156 aligned with the idler wheels 132, 150 and the slide rails 136, the endless track 156 defines six continuous internal bands 158 that define two channels 160 and two channels 162 therebetween (see FIG. 8). The slide rails 136 are received in the channels 160. The idler wheels 132, 150 are received in the channels 162. It is contemplated that some of the continuous internal bands 158 could be replaced by rows of internal lugs. The endless track 156 has a plurality of external lugs 164 on an outer side thereof to provide traction.

The endless track 156 defines a row of apertures 166 (FIG. 8) along a center thereof. The apertures 166 are engaged by the teeth 130 of the drive sprocket 122 as it turns. As a result, the drive track 156 turns around the frame 102, the drive wheel 122, the idler wheels 132, 150, and the slide rails 136, which propels the vehicle 40. It is contemplated that in addition to or instead of the apertures 166, the endless track 156 could be provided with rows of internal lugs to be engaged by axially projecting teeth of an alternative embodiment of the drive sprocket 122.

To mount the rear track assemblies 100 to the vehicle 40, the rear of the vehicle 40 is first raised, with a jack or a lift for example, such that the rear wheels 28 no longer contact the ground. The rear wheels 48 are unfastened from their corresponding rear wheel hub assemblies 34 and removed. The rear track assemblies 100 are then positioned over the rear wheel hub assemblies 34 and the drive sprockets 122 are fastened to their corresponding rear wheel hub assemblies 34 by studs of the rear hull assemblies 34 inserted through the apertures 128 in the drive sprockets 122 and by nuts as described above. A rotation limiting device (also commonly referred to as an "anti-rotation device", not shown) is connected between the frame 102 of each rear track assemblies 100 and the frame 42 of the vehicle 40. The rotation limiting devices limit the rotation of the rear track assemblies 100 about the drive wheel axes 126.

Returning to FIGS. 4 to 10, the idler wheel mounts 140 and the rear idler wheels 150 of the rear, right track assembly 100 will now be described in more detail.

Figure 5:
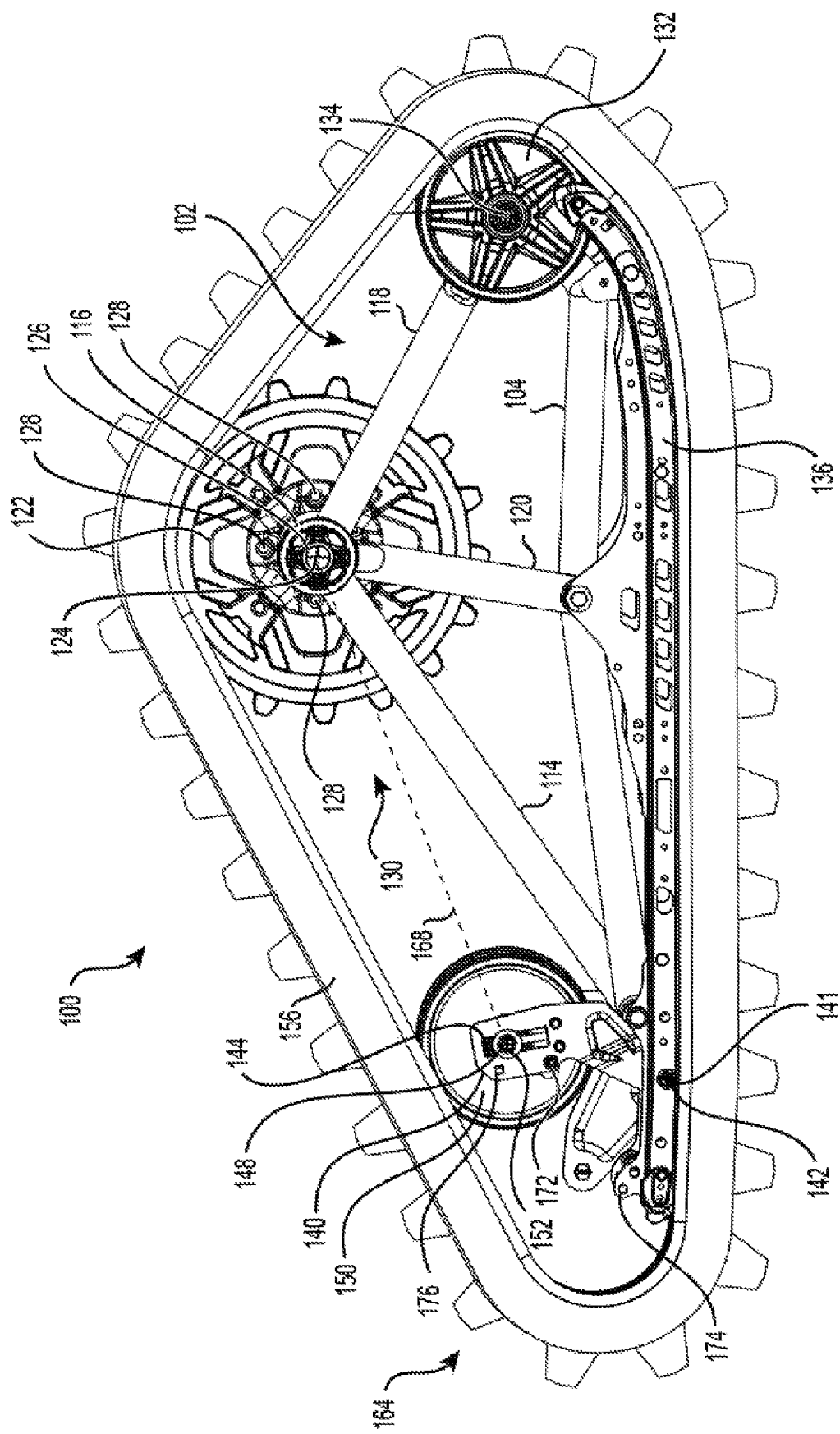
FIG. 5 is a right side elevation view of the track assembly of FIG. 4 with the idler wheel mounts in a released position.
Figure 8:
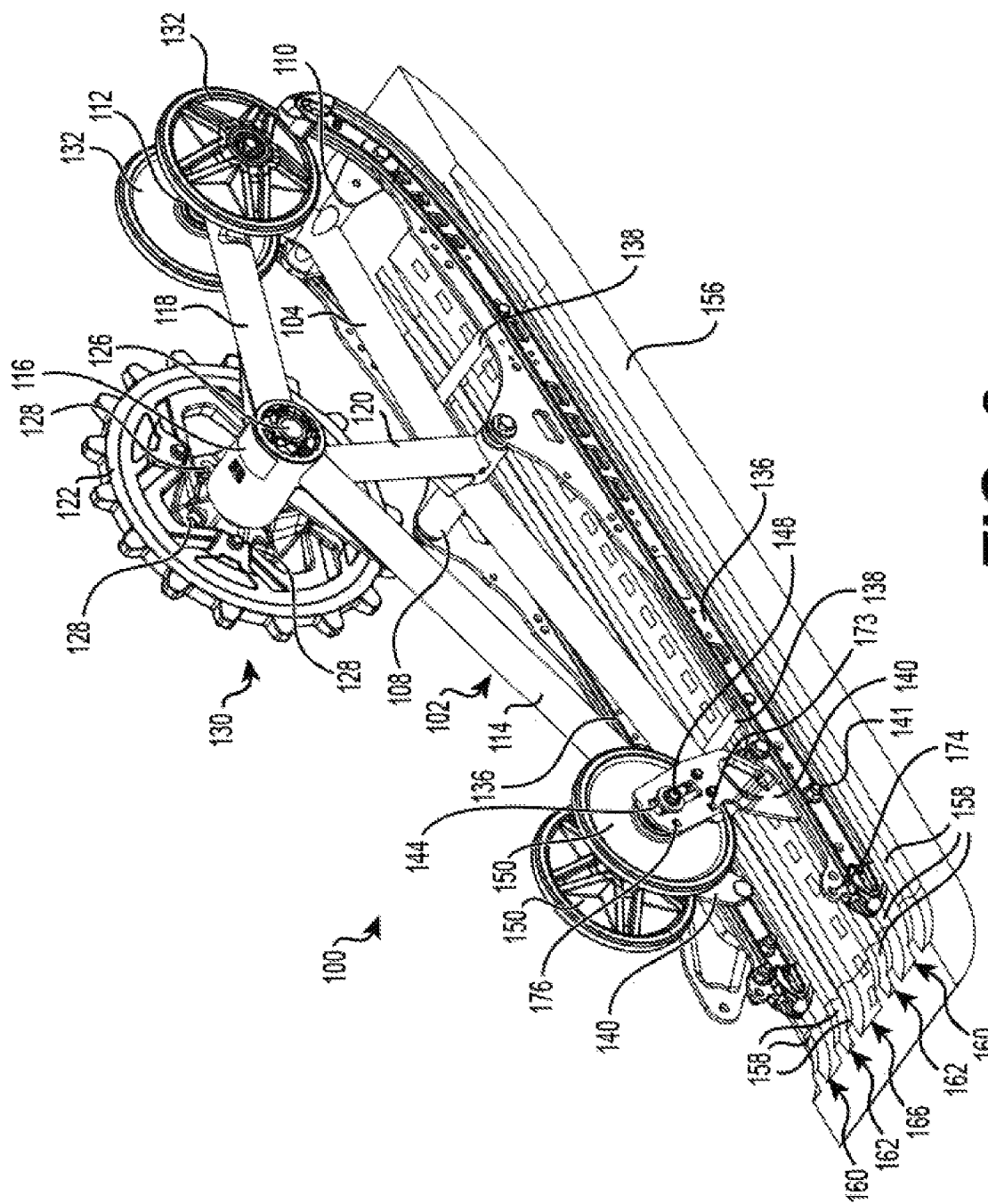
FIG. 8 is a perspective view, taken from a rear, right side of the track assembly of FIG. 4 with the idler wheel mounts in the released position and with a lower portion of the endless track being shown.
Figure 9:
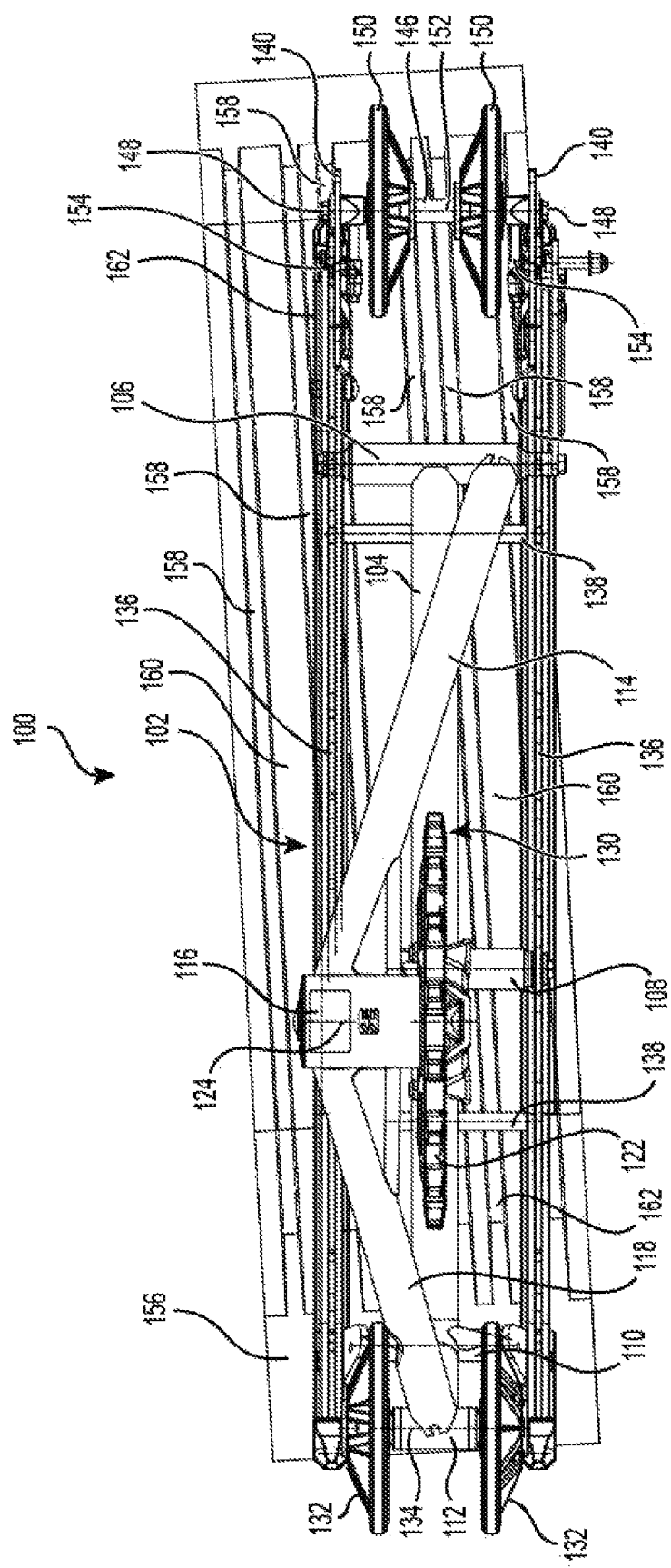
FIG. 9 is a top plan view of the track assembly of FIG. 4 with the idler wheel mounts in the operating position and with a lower portion of the endless track being shown in a derailed configuration.
Figure 10:
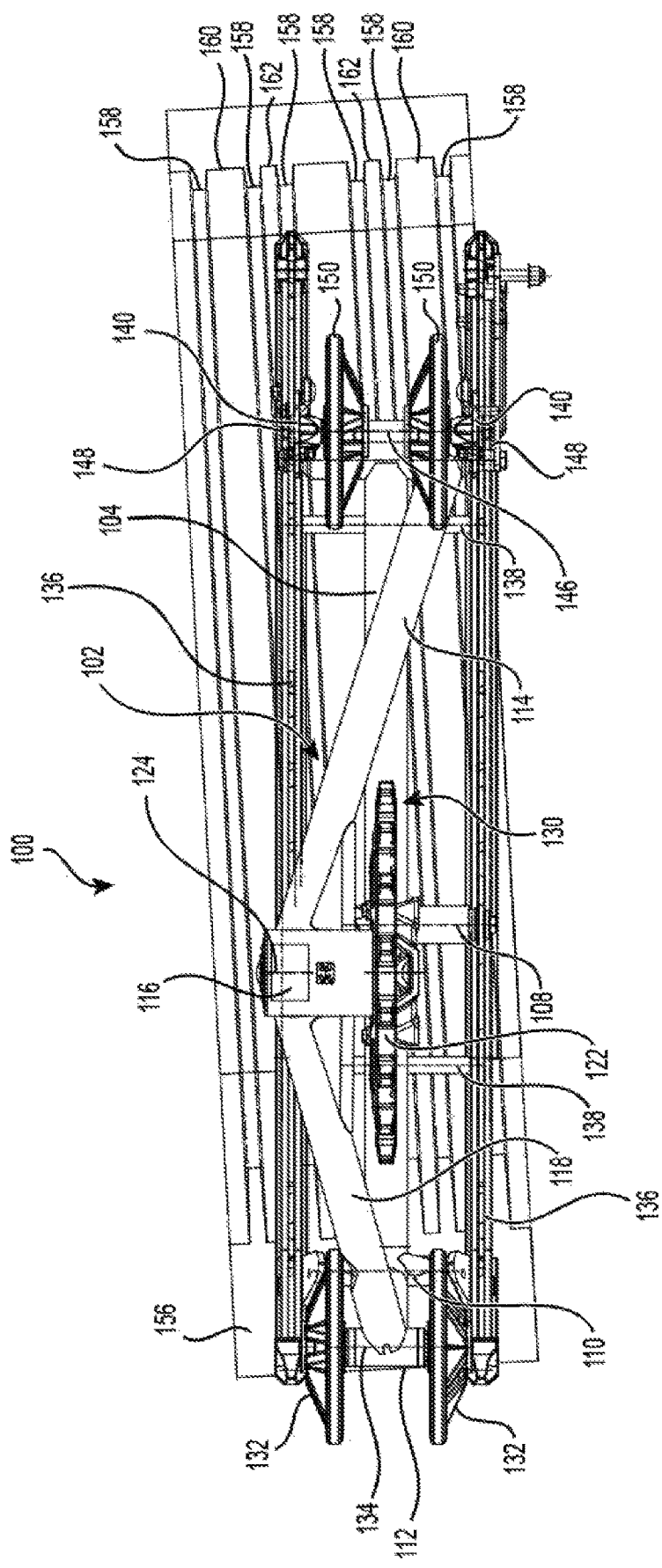
FIG. 10 is a top plan view of the track assembly of FIG. 4 with the idler wheel mounts in the released position and with a lower portion of the endless track being shown in a derailed configuration.

As described above, the idler wheel mounts 140 are pivotable, with the rear idler wheels 150, about the idler wheel mount axis 142 between the operating position shown in FIGS. 4, 6, 7 and 9 and the released position shown in FIGS. 5, 8 and 10. In the operating position of the idler wheel mounts 140, the rear idler wheels 150 tension the endless track 156. The amount of tension applied by the rear idler wheels 150 in the operating position of the idler wheel mounts 140 can be adjusted by the idler wheel position adjusters 154. By moving the rear idler wheels 150 further rearward using the idler wheel position adjusters 154, the tension in the endless track 156 is increased. By moving the rear idler wheels 150 further forward using the idler wheel position adjusters 154, the tension in the endless track 156 is decreased. The idler wheel position adjusters 154 allow for small incremental adjustments of the tension in the endless track 156. By pivoting the idler wheel mounts 140 from the operating position to the released position, at least some of the tension in the endless track 156 is released. In the present embodiment, the amount of tension release in the endless track 156 is sufficient to allow quick and easy removal of the endless track 156 from the rest of the rear track assembly 100 and also quick and easy installation of the endless track 156 onto the rest of the rear track assembly 100. As will be described in greater detail further below, moving the idler wheel mounts 140 to the released position also permits realignment of the endless track 100 with the other components of the rear track assembly 100 should the endless track 156 have derailed. In one embodiment, the rear idler wheels 150 do not tension the endless track 156 when the idler wheel mounts 140 are in the released position. Pivoting the idler wheel mounts 140 from the operating position to the released position is a faster and easier way of releasing the tension in the endless track 156 than by moving the rear idler wheels 150 forward using the idler wheel position adjusters 154. In the present embodiment, more tension can be released from the endless track 156 by pivoting the idler wheel mounts 140 from the operating position to the released position than can be achieved by moving the rear idler wheels 150 to their forwardmost position using the idler wheel position adjusters 154.

As best seen in FIG. 5, the idler wheel mounts 140 have a generally obtuse-L shape (i.e. hockey-stick shape). When the idler wheel mounts 140 are in the operating position, the rear idler wheel axis 152 is rearward of the drive wheel axis 124 and the idler wheel mount axis 142. When the idler wheel mounts 140 are in the released position, the rear idler wheel axis 152 is still rearward of the drive wheel axis 124 but is forward of the idler wheel mount axis 142. In both the operating and released positions, the rear idler wheel axis 152 is vertically higher than the idler wheel mount axis 142. As can be seen, from the operating position, the idler wheel mounts 140 pivot upward and forward about the idler wheel mount axis 142 to the released position. As such, the vertical and longitudinal distances between the rear idler wheel axis 152 and the drive wheel axis 124 are greater when the idler wheel mounts 140 are in the operating position than when the idler wheel mounts 140 are in the released position. As can be seen in FIGS. 5 and 6, in both the operating (FIG. 6) and released (FIG. 5) positions of the idler wheel mounts 140, the idler wheel mount axis 142 is disposed below a line 168 passing through the drive wheel axis 124 and the rear idler wheel axis 152. In the present embodiment, the idler wheel mounts 140 pivot about 80 degrees from the operating position to the released position. In other embodiments it is contemplated that the idler wheel mounts 140 pivot by an angle of more than 70 degrees from the operating position to the released position. Other angles are also contemplated. In some embodiments, the idler wheel mounts 140 pivot from the operating position to the released position by an angle sufficient to allow the endless track 156 to be manually pulled back in position after having derailed.

In order to lock the idler wheel mounts 140 in the operating position, locks 170 are provided to lock the idler wheel mounts 140 to the slide rails 136. In the present embodiment, the locks 170 include fasteners 172. For each idler wheel mount 140, the fastener 172 is inserted through an aperture 173 (FIG. 8) in the idler wheel mount 140 and a corresponding aperture 174 (FIG. 5) in the slide rail 136 thereby fastening the idler wheel mount 140 to the slide rail 136 to lock the idler wheel mount 140 in the operating position. As such, the fastener 172 fastens the idler wheel mount 140 to the frame 102 of the rear track assembly 100 via the slide rail 136 to lock the idler wheel mount 140 in the operating position. In the present embodiment, when the idler wheel mounts 140 are locked in the operating position, the fasteners 172 are located rearward and upward of the idler wheel mount axis 142 and forward and downward of the rear idler wheel axis 152 for most positions of the rear idler wheel 150. Other types of locks are contemplated, such as latches or quick release pins for example. It is also contemplated that only one of the idler wheel mounts 140 could be provided with a lock 170.

Figure 11:
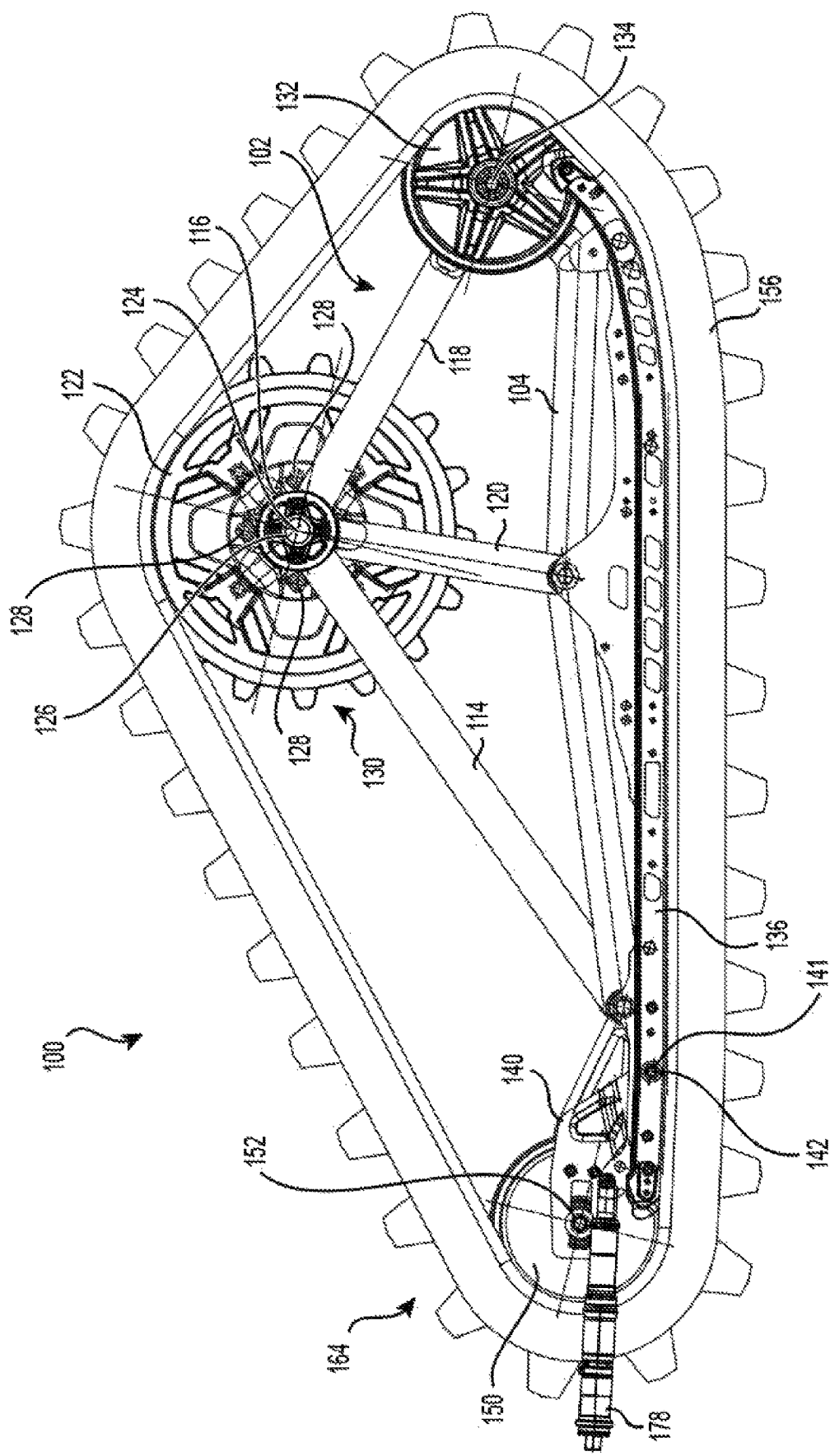
FIG. 11 is a right side elevation view of the track assembly of FIG. 4 illustrating a tool removing a fastener used for locking one of the idler wheel mounts in the operating position.

In order to assist the user in applying the torque necessary to move the idler wheel mounts 140 between the operating position to the released position, the idler wheel mounts 140 are each provided with a holder 176. Each holder 176 is designed to hold a tool onto the corresponding idler wheel mount 140 such that the necessary torque can be applied. In the present embodiment, the holders 176 are square holes 176 that are sized to receive the drive shank of a ratchet wrench 178 (FIG. 11). The square holes 176 are disposed near the lower, rear corners of the idler wheel mounts 140 disposed in the operating position. Although the square holes 176 are sized to receive a drive shank of a ratchet wrench 178, almost any tool or device that can be inserted in the square holes 176 to apply a torque on the idler wheel mounts 140 can be used. It is contemplated that the holders 176 could be something other than a hole. For example, the holders 176 could be a pin or another type of projection that can be grabbed by pliers or a wrench used to unfasten fasteners 172. It is contemplated that only one of the idler wheel mounts 140 could be provided with a holder 176. It is also contemplated that in some embodiments, the holders 176 could be omitted.

As discussed in the background section, under certain operating conditions it is possible for the endless track to derail from the other components of the track assembly. FIGS. 9 and 10 show the endless track 156 of the rear track assembly 100 having derailed. As can be seen, the slide rails 136 and the idler wheels 132, 150 are no longer received in their corresponding channels 160, 162. When this happens for the rear track assembly 100, the endless track 156 can be installed again by first pivoting the idler wheel mounts 140 from the operating position to the released position as will now be described with reference to FIGS. 11 to 13. Although the method for installing the endless track 156 having derailed from the other components of the rear track assembly 100 provided on the vehicle 40 will be described using the ratchet wrench 178, it is contemplated that the method could be performed with a different tool or device, with multiple tools or devices and, in some embodiments, without any tools.

Figure 13:
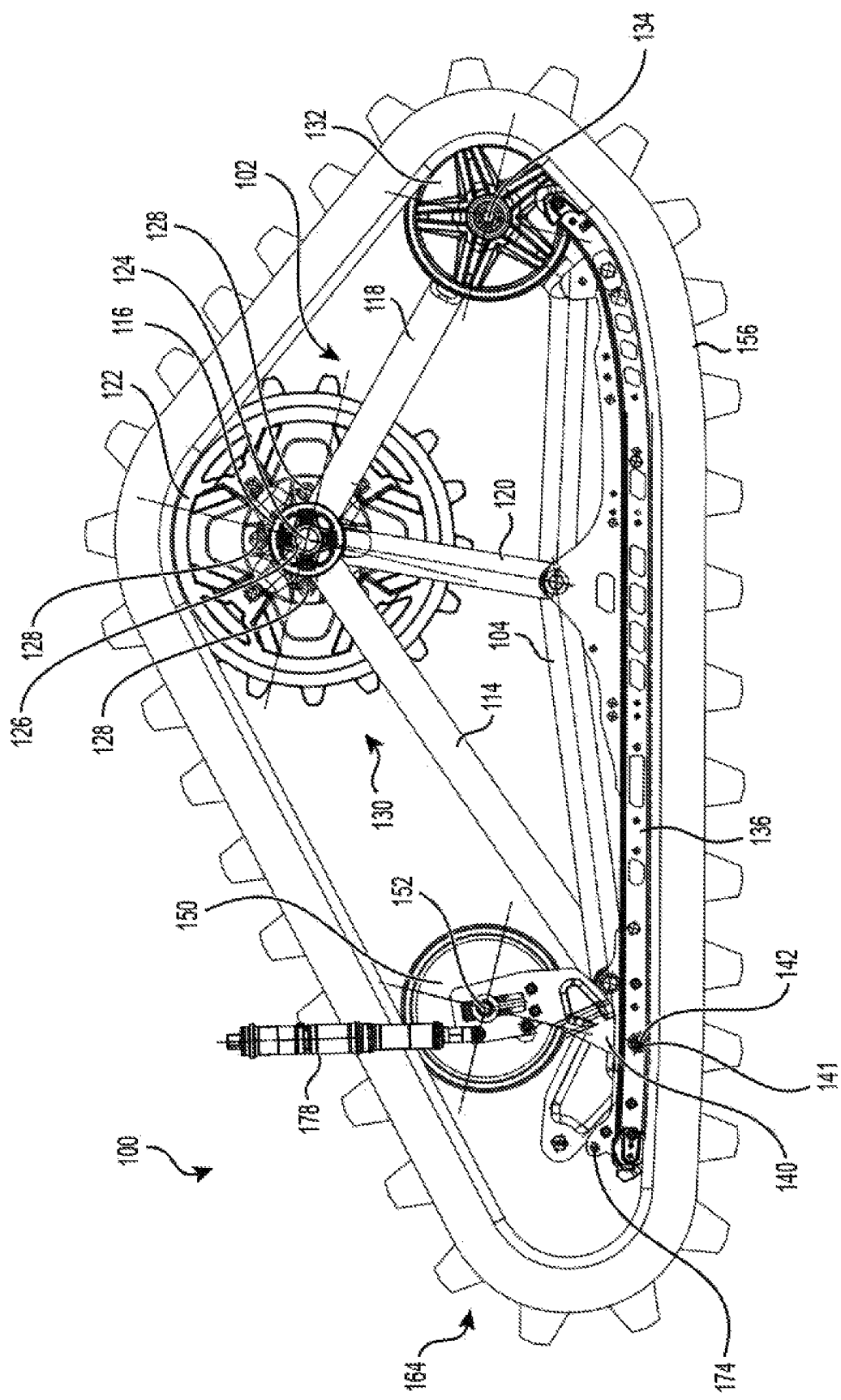
FIG. 13 is a right side elevation view of the track assembly of FIG. 4 illustrating the tool having pivoted the idler wheel mounts to the release position.

When the endless track 156 derails, the first thing to do is to stop the engine of the vehicle 40 and ensure that the vehicle is stable. Then, the idler wheel mounts 140 are unlocked from the frame 102 of the rear track assembly 100. This is done by removing the fasteners 172 connecting the idler wheel mounts 140 to the slide rails 136 using the ratchet wrench 178 which has been provided with the proper socket as seen in FIG. 11. Once the idler wheel mounts 140 are unlocked, the idler wheel mounts 140 and the rear idler wheels 150 are pivoted about the idler wheel mount axis 142 from the operating position to the released position. This movement is helped by inserting the drive shank of the ratchet wrench 178 into the square hole (i.e. holder 176) of one of the idler wheel mounts 140 as shown in FIG. 12, and then applying torque to the idler wheel mounts 140 using the ratchet wrench 178 to pivot the idler wheel mounts 140, and the rear idler wheels 150, upward and forward to the released position as shown in FIG. 13. Once the idler wheel mounts 140 are in the released position, the ratchet wrench 178 is remove from the holder 176 and the endless track 156 is realigned with the other components of the rear track assembly 100. More specifically, the slide rails 136 and the idler wheels 132, 150 are placed in their corresponding channels 160, 162 and teeth 130 of the drive wheel 122 are place inside apertures 166. Once the endless track 156 is realigned, the ratchet wrench 178 is reengaged with the holder 176, then the idler wheel mounts 140 and the rear idler wheels 150 are pivoted about the idler wheel mount axis 142 from the released position back to the operating position using the ratchet wrench 178. As a result, the endless track is tensioned. Finally, the idler wheel mounts 140 are locked in the operating position to the frame 102 of the track assembly. This is done by fastening the idler wheel mounts 140 to the slide rails 136 using the fasteners 172 and the ratchet wrench 178 which has been provided with the proper socket.

Figure 14:
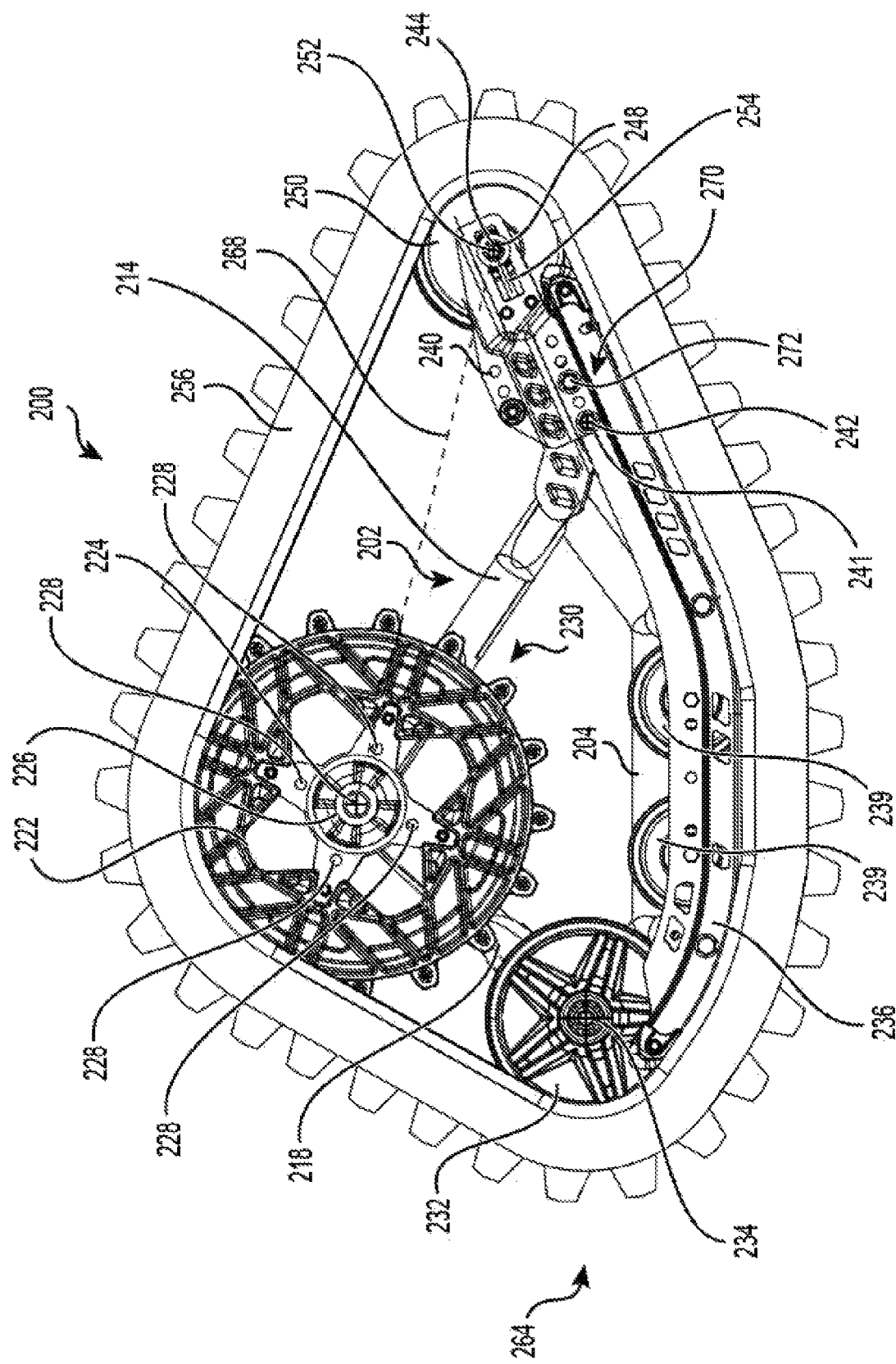
FIG. 14 is a right side elevation view of a front, left track assembly of the vehicle of FIG. 3 with idler wheel mounts of the track assembly being in an operating position.
Figure 15:
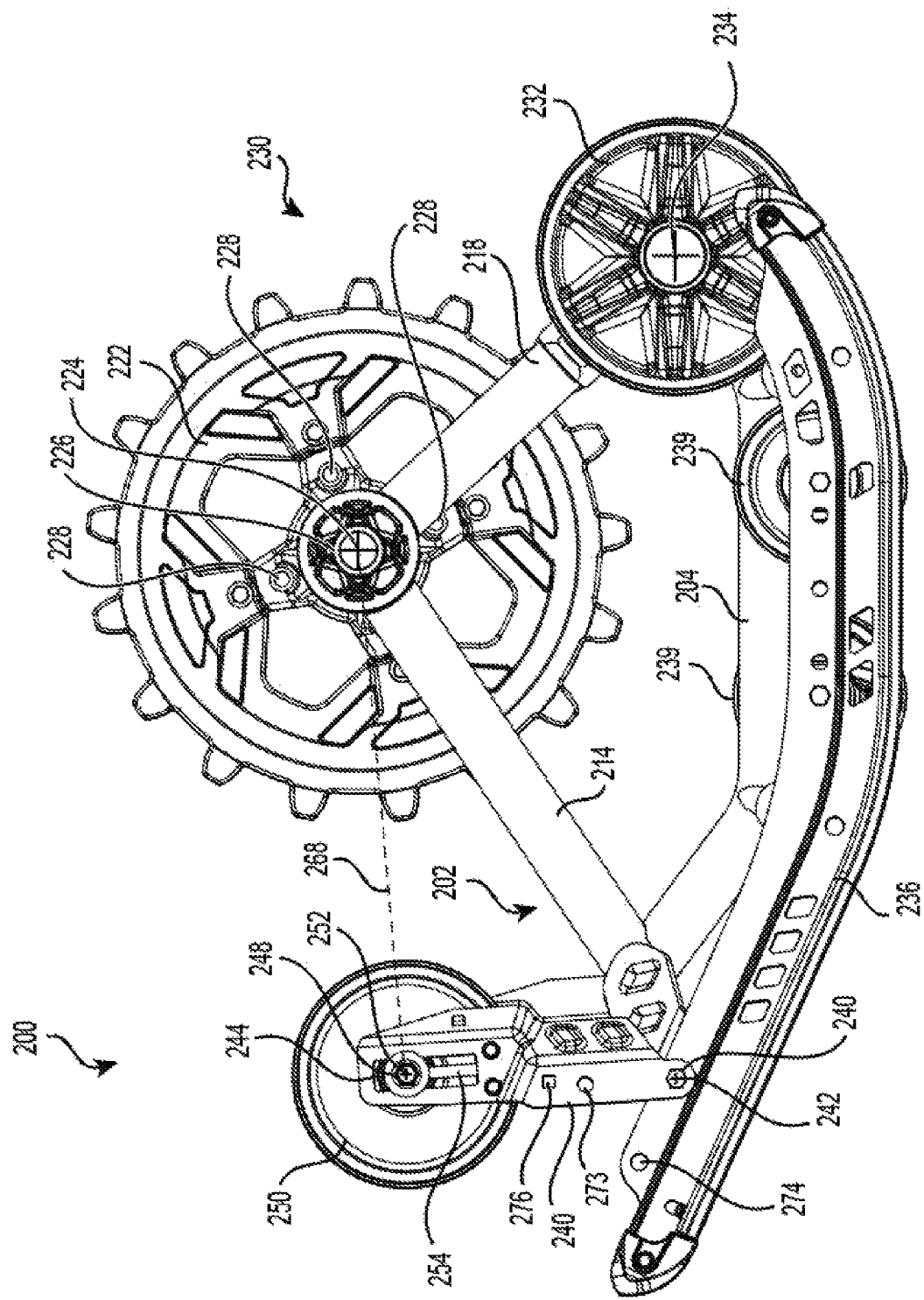
FIG. 15 is a left side elevation view of the track assembly of FIG. 14 with the idler wheel mounts in a released position and the endless track removed.
Figure 16:
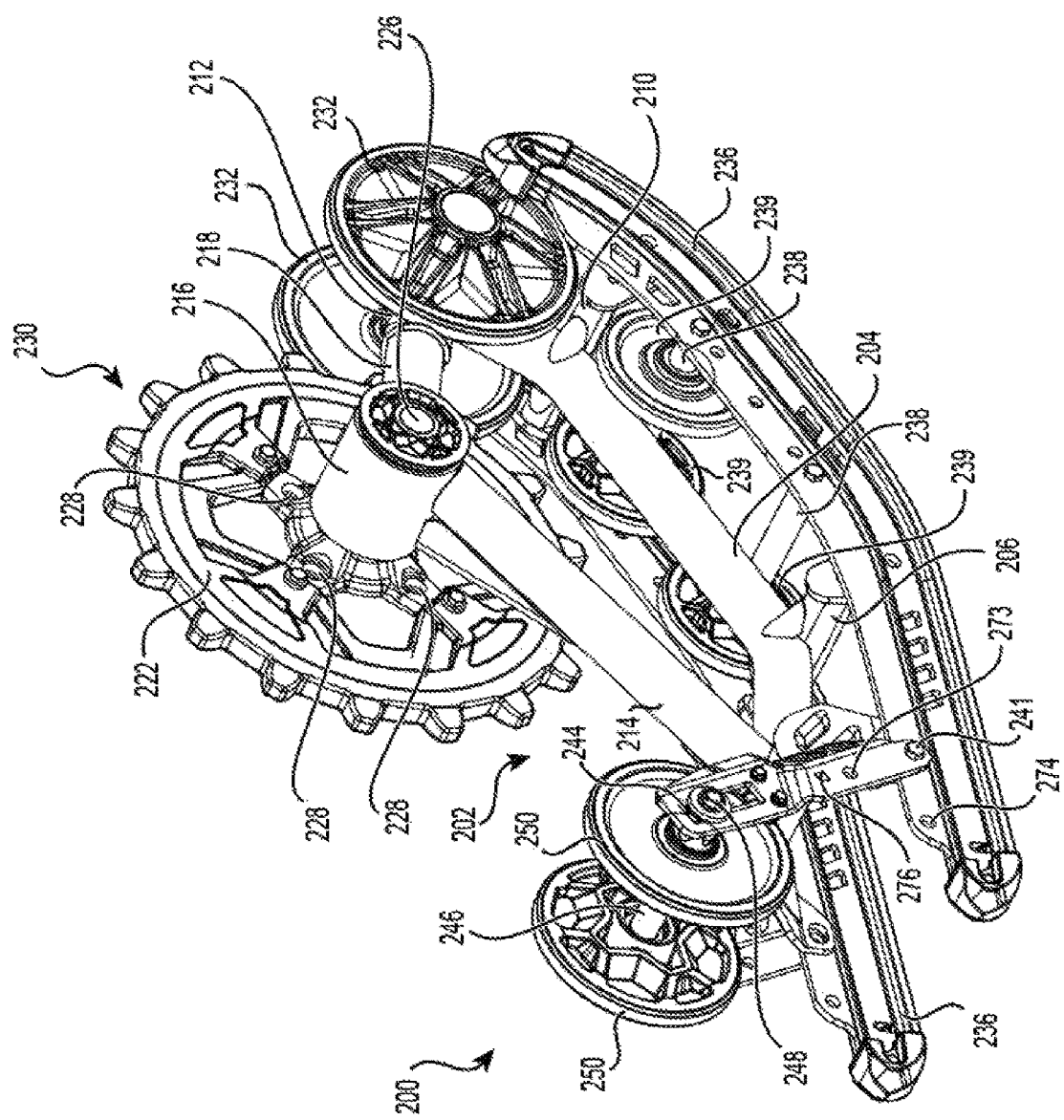
FIG. 16 is a perspective view taken from a front, left side of the track assembly of FIG. 14 with the idler wheel mounts in a released position and the endless track removed.

Turning now to FIGS. 14 to 16, a front, left track assembly 200 of the vehicle 40 of FIG. 3 will be described in more detail. A front, right track assembly 200 of the vehicle 40 is a mirror image of the front, left track assembly 200 and as such will not be described herein in detail. As can be seen by comparing the front right track assembly 200 to the rear right track assembly 100, the front track assembly 200 is shorter in length than the rear track assembly 100. Also, the lower front and rear portions of the front track assembly 200 extend diagonally upward from a central flat portion. Both of these features (i.e. shorter length and diagonally upward lower portions) facilitate steering of the front track assembly 200.

The track assembly 200 has a frame 202. The frame 202 has a lower, longitudinally extending frame member 204. As best seen in FIG. 16, the frame member 204 is connected to a front cross-member 206 at front thereof and a rear cross-member 210 near a rear thereof. The rear end of the lower frame member 204 is connected to an axle holder 212. The frame 202 also includes a frame member 214 extending upward and rearward from a front of the lower frame member 204 to an axle holder 216 and a frame member 218 extending upward and forward from a rear of the lower frame member 204 to the axle holder 216.

A drive wheel 222 is rotatably mounted to an upper end of the frame 202 about a drive wheel axis 224. More specifically, the drive wheel 222 is connected to an axle 226 that is supported by bearings (not shown) disposed inside the axle holder 216. The drive wheel 222 defines four apertures 228. The drive wheel 222 is disposed on the front wheel hub assembly 30 such that studs extending from the front wheel hub assembly 30 are received in the apertures 228. Nuts are then fastened onto the studs to fasten the drive wheel 222 to the front wheel hub assembly 30 such that the drive wheel 222 can be driven. In the present implementation, the drive wheel 222 is a drive sprocket 222 having a plurality of radially projecting sprocket teeth 230. In an alternative embodiment, it is contemplated that in addition to or instead of the sprocket teeth 230, the drive sprocket 222 could have axially projecting teeth along a periphery thereof on one or both sides thereof.

Two rear idler wheels 232 are rotationally connected to the axle holder 212 about a rear idler wheel axis 234. The rear idler wheels 232 are disposed on either side of the axle holder 212. As can be seen in FIG. 15, the rear idler wheel axis 234 is rearward and downward of the drive wheel axis 224.

Two slide rails 236 are connected to the lower end of the frame 202. As best seen in FIG. 16, the left slide rail 236 is connected to the left ends of the cross-members 206, 210 and the right slide rail 236 is connected to the right ends of the cross-members 206, 210. Two axles 238 are also connected between the two slide rails 236 and longitudinally between the cross-members 206, 210. Two idler wheels 239 are mounted on the rear axle 238 and one idler wheel 239 is mounted on the front axle 238. The bottom of each slide rail 236 is flat at the center, is upturned at the rear, and has a front portion that extends upward and forward from the center portion.

Two idler wheel mounts 240 are pivotally connected to the front portions of the slide rails 236 by fasteners 241. As such, the idler wheel mounts 240 are pivotally connected to the frame 202 via the slide rails 236. The idler wheel mounts 240 are selectively pivotable together about an idler wheel mount axis 242 between an operating position shown in FIG. 14 and a released position shown in FIGS. 15 and 16. The idler wheel mount axis 242 extends transversely through both slide rails 236 and is disposed vertically below and forward of the drive wheel axis 224.

Each idler wheel mount 240 defines a slot 244. An axle 246 is connected to and extends between the idler wheel mounts 240 via fasteners 248 inserted through the slots 244. A pair of front idler wheels 250 is mounted to the axle 246 so as to be rotationally connected to the idler wheel mounts 240. The front idler wheels 250 rotate about a front idler wheel axis 252 defined by the axle 246. The front idler wheels 250 and the axle 246 selectively pivot about the idler wheel mount axis 242 together with the idler wheel mounts 240. As can be seen in FIG. 14, when the idler wheel mounts 240 are in the operating position, a projection of the slide rails 236 onto a vertically and longitudinally extending plane (i.e. the plane corresponding to the drawing page for FIG. 14) overlap a projection of the front idler wheels 250 on this plane. Two idler wheel position adjusters 254 are connected between the idler wheel mounts 240 and the axle 246. The idler wheel position adjusters 254 selectively adjust a position of the axle 246, and therefore the front idler wheels 250, on the idler wheel mounts 240. In the present embodiments, the idler wheel position adjusters 254 include fasteners that when turned move the axle 246 forward or rearward by making the fasteners 248 translate in the slots 244.

It is contemplated that more or less idler wheels 239 could be provided. It is also contemplated that the idler wheels 239 could be omitted. It is also contemplated that the idler wheels 239 could be connected to the lower frame member 204 instead of the slide rails 236 via the axles 236. It is also contemplated that the idler wheel mounts 240 could be pivotally connected directly to the frame 202 instead of the slide rails 236. In an embodiment where the idler wheel mounts 240 are pivotally connected directly to the frame 202, it is contemplated that the slide rails 136 could be omitted and that the idler wheels 239 would be connected to the lower portion of the frame 202.

The idler wheel mounts 240 and the rear idler wheels 250 will be described in more detail further below.

The front track assembly 200 also has an endless track 256. The endless track 256 is disposed around the frame 202, the drive wheel 222, the idler wheels 232, 239, 250, and the slide rails 236. More specifically, the drive wheel 222 and the idler wheels 232, 239, 250 abut an inner surface of the endless track 256 and roll along the inner surface of the endless track 256 when in operation. The slide rails 236 also abut the inner surface of the endless track 256 which slides relative to the endless track 256 when in operation. In order to keep the endless track 256 aligned with the idler wheels 232, 239, 250 and the slide rails 236, the endless track 256 defines six continuous internal bands that define four channels therebetween (now shown but similar to those of the endless track 156). The slide rails 236 are received in two of the channels. The idler wheels 232, 239, 250 are received in the other two channels. It is contemplated that some of the continuous internal bands could be replaced by rows of internal lugs. The endless track 256 has a plurality of external lugs 264 on an outer side thereof to provide traction.

The endless track 256 defines a row of apertures (not shown but similar to the apertures 166 of the endless track 156) along a center thereof. The apertures are engaged by the teeth 230 of the drive sprocket 122 as it turns. As a result, the drive track 256 turns around the frame 202, the drive wheel 222, the idler wheels 232, 239, 250, and the slide rails 236, which propels the vehicle 40. It is contemplated that in addition to or instead of these apertures, the endless track 156 could be provided with rows of internal lugs to be engaged by axially projecting teeth of an alternative embodiment of the drive sprocket 222.

The front track assemblies 200 are mounted to the vehicle 40 by fastening the drive sprockets 222 to the front wheel hub assemblies 30. This installation is similar to the manner in which the rear track assemblies 100 are mounted to the vehicle 40 and as such will not be described herein.

The idler wheel mounts 240 and the front idler wheels 250 of the front, left track assembly 200 will now be described in more detail.

As described above, the idler wheel mounts 240 are pivotable, with the front idler wheels 250, about the idler wheel mount axis 242 between the operating position shown in FIG. 14 and the released position shown in FIGS. 15 and 16. In the operating position of the idler wheel mounts 240, the front idler wheels 250 tension the endless track 256. The amount of tension applied by the front idler wheels 250 in the operating position of the idler wheel mounts 240 can be adjusted by the idler wheel position adjusters 254. By moving the front idler wheels 250 further forward using the idler wheel position adjusters 254, the tension in the endless track 256 is increased. By moving the front idler wheels 250 further rearward using the idler wheel position adjusters 254, the tension in the endless track 256 is decreased. The idler wheel position adjusters 254 allow for small incremental adjustments of the tension in the endless track 256. By pivoting the idler wheel mounts 240 from the operating position to the released position, at least some of the tension in the endless track 256 is released. In the present embodiment, the amount of tension release in the endless track 256 is sufficient to allow quick and easy removal of the endless track 256 from the rest of the front track assembly 200 and also quick and easy installation of the endless track 256 onto the rest of the front track assembly 200. As will be described in greater detail further below, moving the idler wheel mounts 240 to the released position also permits realignment of the endless track 200 with the other components of the front track assembly 200 should the endless track 256 have derailed. In one embodiment, the front idler wheels 250 do not tension the endless track 256 when the idler wheel mounts 240 are in the released position. Pivoting the idler wheel mounts 240 from the operating position to the released position is a faster and easier way of releasing the tension in the endless track 256 than by moving the front idler wheels 250 rearward using the idler wheel position adjusters 254. In the present embodiment, more tension can be released from the endless track 256 by pivoting the idler wheel mounts 240 from the operating position to the released position than can be achieved by moving the front idler wheels 250 to their rearmost position using the idler wheel position adjusters 254.

As best seen in FIG. 15, the idler wheel mounts 240 are generally straight. When the idler wheel mounts 240 are in the operating position, the front idler wheel axis 252 is forward of the drive wheel axis 224 and the idler wheel mount axis 242. When the idler wheel mounts 240 are in the released position, the front idler wheel axis 252 is still forward of the drive wheel axis 224 but is rearward of the idler wheel mount axis 242. In both the operating and released positions, the front idler wheel axis 252 is vertically higher than the idler wheel mount axis 242. As can be seen, from the operating position, the idler wheel mounts 240 pivot upward and rearward about the idler wheel mount axis 242 to the released position. As such, the vertical and longitudinal distances between the front idler wheel axis 252 and the drive wheel axis 224 are greater when the idler wheel mounts 240 are in the operating position than when the idler wheel mounts 240 are in the released position. As can be seen in FIGS. 14 and 15, in both the operating (FIG. 14) and released (FIG. 15) positions of the idler wheel mounts 240, the idler wheel mount axis 242 is disposed below a line 268 passing through the drive wheel axis 224 and the front idler wheel axis 252. In the present embodiment, the idler wheel mounts 240 pivot about 60 degrees from the operating position to the released position. In other embodiments it is contemplated that the idler wheel mounts 240 pivot by an angle of more than 50 degrees from the operating position to the released position. Other angles are also contemplated. In some embodiments, the idler wheel mounts 240 pivot from the operating position to the released position by an angle sufficient to allow the endless track 256 to be manually pulled back in position after having derailed.

In order to lock the idler wheel mounts 240 in the operating position, locks 270 are provided to lock the idler wheel mounts 240 to the slide rails 236. In the present embodiment, the locks 270 include fasteners 272. For each idler wheel mount 240, the fastener 272 is inserted through an aperture 273 (FIG. 15) in the idler wheel mount 240 and a corresponding aperture 274 (FIG. 15) in the slide rail 236 thereby fastening the idler wheel mount 240 to the slide rail 236 to lock the idler wheel mount 240 in the operating position. As such, the fastener 272 fastens the idler wheel mount 240 to the frame 202 of the front track assembly 200 via the slide rail 236 to lock the idler wheel mount 240 in the operating position. In the present embodiment, when the idler wheel mounts 240 are locked in the operating position, the fasteners 272 are located forward and upward of the idler wheel mount axis 242 and rearward and downward of the front idler wheel axis 252. Other types of locks are contemplated, such as latches or quick release pins for example. It is also contemplated that only one of the idler wheel mounts 240 could be provided with a lock 270.

In order to assist the user in applying the torque necessary to move the idler wheel mounts 240 between the operating position to the released position, the left idler wheel mount 240 is provided with a holder 276 (FIG. 15). The holder 276 is designed to hold a tool onto the left idler wheel mount 240 such that the necessary torque can be applied. In the present embodiment, the holder 276 is a square hole 276 that is the same size as the square holes 176 of the idler wheel mounts 140 described above in order to receive the drive shank of the ratchet wrench 178. The square hole 276 are disposed near the center of the left idler wheel mount 240. It is contemplated that the holder 276 could be something other than a hole. For example, the holder 276 could be a pin or another type of projection that can be grabbed by pliers or a wrench used to unfasten fasteners 172. It is contemplated that both idler wheel mounts 140 could be provided with a holder 276. It is also contemplated that in some embodiments, the holder 276 could be omitted.

When the endless track 256 derails from the front track assembly 200, the drive track 256 can be installed again by pivoting the idler wheel mounts 240 about the idler wheel mount axis 242 upward and rearward from the operating position to the released position. As the method for installing the endless track 256 having derailed from the other components of the front track assembly 200 provided on the vehicle 40 is similar to the method for installing the endless track 156 having derailed from the other components of the rear track assembly 100 described above, this method will not be described in detail herein.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A track assembly for a vehicle comprising:
   a frame;
   a drive wheel rotatably mounted to the frame about a drive wheel axis;
   an idler wheel mount pivotally connected to the frame about an idler wheel mount axis,
   the idler wheel mount axis being vertically below and longitudinally spaced from the drive wheel axis,
   the idler wheel mount being selectively pivotable between an operating position and a released position about the idler wheel mount axis,
   the idler wheel mounting pivoting upward and rearward from the operating position to the released position;
   a lock selectively locking the idler wheel mount in the operating position;
   a front idler wheel rotationally connected to the idler wheel mount about a front idler wheel axis,
   the front idler wheel axis being forward of the drive wheel axis,
   the front idler wheel being pivotable about the idler wheel mount axis with the idler wheel mount,
   in the operating position of the idler wheel mount, the front idler wheel axis being forward of the idler wheel mount axis, and the front idler wheel axis being at a first longitudinal distance and at a first vertical distance from the drive wheel axis,
   in the released position of the idler wheel mount, the front idler wheel axis being rearward of the idler wheel mount axis, and the front idler wheel axis being at a second longitudinal distance and at a second vertical distance from the drive wheel axis,
   the first longitudinal distance being greater than the second longitudinal distance, the first vertical distance being greater than the second vertical distance; and an endless track driven by the drive wheel around the frame, in the operating position of the idler wheel mount, the front idler wheel tensioning the endless track, and pivoting the idler wheel mount from the operating position to the released position releasing at least some tension from the endless track.

2. The track assembly of claim 1, wherein, in the operating position of the idler wheel mount, the front idler wheel axis is vertically higher than the idler wheel mount axis.

3. The track assembly of claim 1, wherein:
the lock includes a fastener; and
the fastener fastening the idler wheel mount to the frame for locking the idler wheel mount in the operating position.

4. The track assembly of claim 3, further comprising a slide rail connected to a lower end of the frame;
wherein:
the idler wheel mount is pivotally connected to the slide rail;
the idler wheel mount axis extends through the slide rail; and
the fastener fastens the idler wheel mount to the slide rail for locking the idler wheel mount in the operating position.

5. The track assembly of claim 4, wherein, in the operating position, a projection of the slide rail on a vertically and longitudinally extending plane overlaps a projection of the front idler wheel on the plane.

6. The track assembly of claim 1, further comprising a slide rail connected to a lower end of the frame;
wherein:
the idler wheel mount is pivotally connected to the slide rail;
the idler wheel mount axis extends through the slide rail; and
the lock locks the idler wheel mount to the slide rail for locking the idler wheel mount in the operating position.

7. The track assembly of claim 1, wherein the drive wheel is rotatably mounted to an upper end of the frame.

8. The track assembly of claim 1, further comprising an idler wheel position adjuster connecting the front idler wheel to the idler wheel mount, the idler wheel position adjuster selectively changing a position of the front idler wheel on the idler wheel mount for adjusting an amount of tension applied by the front idler wheel on the endless track when the idler wheel mount is in the operating position.

9. The track assembly of claim 8, wherein, in response to the idler wheel mount being in the operating position:
the idler wheel position adjuster is adapted for changing a position of the front idler wheel between a first position and a second position,
the first position of the front idler wheel being a position of the front idler wheel where the front idler wheel is longitudinally furthest from the drive wheel axis, and
the second position of the front idler wheel being a position of the front idler wheel where the front idler wheel is longitudinally closest to the drive wheel axis; and
wherein more tension is released from the endless track by pivoting the idler wheel mount from the operating position to the released position than by moving the front idler wheel from the second position to the first position while the idler wheel mount is in the operating position.

10. The track assembly of claim 8, wherein the idler wheel mount is selectively pivotable between the operating position and the released position about the idler wheel mount axis with the idler wheel position adjuster keeping the front idler wheel in a fixed position on the idler wheel mount.

11. The track assembly of claim 1, further comprising a holder provided on the idler wheel mount for holding a tool onto the idler wheel mount for applying a torque to the idler wheel mount to pivot the idler wheel mount between the operating and released positions.

12. The track assembly of claim 1, wherein the idler wheel mount axis is disposed below a line passing through the drive wheel axis and the front idler wheel axis.

13. The track assembly of claim 1, wherein the drive wheel is adapted for connection to a rotatable axle of a vehicle.

14. The track assembly of claim 13, wherein the drive wheel defines a plurality of apertures used for fastening the drive wheel to a wheel hub assembly driven by the rotatable axle of the vehicle.

15. The track assembly of claim 1, wherein:
the frame defines a first aperture;
the idler wheel mount defines a second aperture;
in the operating position, the second aperture is aligned with the first aperture; and
in the released position, the second aperture is not aligned with the first aperture.

16. A method for installing an endless track having derailed from other components of a track assembly provided on a vehicle, the track assembly having:
a frame;
a drive wheel rotatably mounted to the frame about a drive wheel axis; and
the endless track adapted to be driven by the drive wheel around the frame;
the method comprising:
unlocking an idler wheel mount from the frame;
once the idler wheel mount is unlocked, pivoting the idler wheel mount and a front idler wheel upward and rearward about an idler wheel mount axis from an operating position to a released position,
the front idler wheel being rotationally connected to the idler wheel mount about a front idler wheel axis,
the front idler wheel axis being forward of the drive wheel axis;
once the idler wheel mount is in the released position and with the idler wheel mount in the released position, realigning the endless track with the other components of the track assembly,
in the released position, the front idler wheel axis being rearward of the idler wheel mount axis;
once the endless track is realigned, pivoting the idler wheel mount and the front idler wheel about the idler wheel mount axis from the released position back to the operating position thereby tensioning the endless track,
in the operating position, the front idler wheel axis being forward of the idler wheel mount axis; and
once the idler wheel mount is back in the operating position, locking the idler wheel mount in the operating position to the frame.

17. The method of claim 16, wherein pivoting the idler wheel mount and the front idler wheel about the idler wheel mount axis from the released position back to the operating position comprises engaging the idler wheel mount with a tool and applying torque to the idler wheel mount using the tool.

18. A track assembly for a vehicle comprising:
a frame;
a slide rail connected to a lower end of the frame;
a drive wheel rotatably mounted to the frame about a drive wheel axis;
an idler wheel mount pivotally connected to the slide rail about an idler wheel mount axis,
the idler wheel mount axis extending through the slide rail,
the idler wheel mount axis being vertically below and longitudinally spaced from the drive wheel axis,
the idler wheel mount defining an aperture,
the idler wheel mount being selectively pivotable between an operating position and a released position about the idler wheel mount axis,
in the operating position, the aperture being longitudinally spaced from and forward of the idler wheel mount axis;
a lock selectively locking the idler wheel mount in the operating position,
the lock including a fastener,
the fastener being inserted through the aperture for fastening the idler wheel mount to the frame for locking the idler wheel mount in the operating position;
an idler wheel rotationally connected to the idler wheel mount about an idler wheel axis,
the front idler wheel being pivotable about the idler wheel mount axis with the idler wheel mount,
in the operating position of the idler wheel mount, the idler wheel axis being at a first longitudinal distance and at a first vertical distance from the drive wheel axis,
in the released position of the idler wheel mount, the idler wheel axis being at a second longitudinal distance and at a second vertical distance from the drive wheel axis,
the first longitudinal distance being greater than the second longitudinal distance,
the first vertical distance being greater than the second vertical distance; and
an endless track driven by the drive wheel around the frame,
in the operating position of the idler wheel mount, the idler wheel tensioning the endless track, and
pivoting the idler wheel mount from the operating position to the released position releasing at least some tension from the endless track.

19. The track assembly of claim 18, wherein:
the aperture is a first aperture;
the slide rail defines a second aperture;
in the operating position, the second aperture is aligned with the first aperture;
in the released position, the second aperture is not aligned with the first aperture; and
the fastener is inserted through the first aperture and the second aperture for fastening the idler wheel mount to the slide rail for locking the idler wheel mount in the operating position.

20. The track assembly of claim 18, wherein, in the operating position of the idler wheel mount, the idler wheel axis is vertically higher than the idler wheel mount axis.

* * * * *